United States Patent
Lee et al.

(10) Patent No.: US 10,901,531 B2
(45) Date of Patent: Jan. 26, 2021

(54) METHOD FOR CONTROLLING POINTER IN VIRTUAL REALITY AND ELECTRONIC DEVICE

(71) Applicant: Samsung Electronics Co., Ltd., Suwon-si (KR)

(72) Inventors: Young-Pil Lee, Yongin-si (KR); Hyun-Jun Kim, Suwon-si (KR); Byung-Hoon Nam, Seoul (KR); Jung-Jae Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/117,598

(22) Filed: Aug. 30, 2018

(65) Prior Publication Data

US 2019/0079599 A1 Mar. 14, 2019

(30) Foreign Application Priority Data

Sep. 8, 2017 (KR) .................. 10-2017-0115455

(51) Int. Cl.
*G06F 3/0346* (2013.01)
*G06F 3/01* (2006.01)
(Continued)

(52) U.S. Cl.
CPC ......... *G06F 3/0346* (2013.01); *G02B 27/017* (2013.01); *G06F 3/011* (2013.01);
(Continued)

(58) Field of Classification Search
CPC ........... G06F 3/048–0487; G06F 3/033; G06F 3/0346
See application file for complete search history.

(56) References Cited

U.S. PATENT DOCUMENTS 9,323,338 B2 * 4/2016 He .................. G06F 3/017
9,778,814 B2 * 10/2017 Ambrus ............ G02B 27/017
(Continued)

FOREIGN PATENT DOCUMENTS

KR 10-2016-0139318 A 12/2016
KR 10-2017-0000801 A 1/2017

OTHER PUBLICATIONS

International Search Report dated Dec. 13, 2018, issued in International Application No. PCT/KR2018/010509.
(Continued)

*Primary Examiner* — Patrick F Marinelli
(74) *Attorney, Agent, or Firm* — Jefferson IP Law, LLP

(57) ABSTRACT

An electronic device for controlling a pointer in virtual reality (VR) is provided. The electronic device includes a display, a communication circuit, a processor electrically connected with the display and the communication circuit, and a memory electrically connected with the processor, wherein the memory may store instructions executed to enable the processor to receive a control signal from an external controller through the communication circuit, identify a direction based on at least the received control signal, determine a first position in a designated first distance range, which is away from a first reference position related to the external controller along the identified direction, in a virtual space displayed through the display, and control the display to display a pointer on a screen of the virtual space based on the first position.

20 Claims, 29 Drawing Sheets

(51) Int. Cl.
*G06F 3/0484* (2013.01)
*G02B 27/01* (2006.01)
*G06F 3/0481* (2013.01)
*G06T 19/20* (2011.01)

(52) U.S. Cl.
CPC ...... *G06F 3/04815* (2013.01); *G06F 3/04842* (2013.01); *G06T 19/20* (2013.01)

(56) References Cited

U.S. PATENT DOCUMENTS

| | | | |
|---|---|---|---|
| 10,083,539 B2* | 9/2018 | Buhlmann | G06F 3/033 |
| 2013/0321347 A1* | 12/2013 | Kim | G06F 3/017 345/175 |
| 2014/0228921 A1 | 8/2014 | Howard | |
| 2014/0306875 A1* | 10/2014 | He | G06F 3/017 345/156 |
| 2014/0354602 A1* | 12/2014 | He | G06F 3/017 345/175 |
| 2014/0364209 A1 | 12/2014 | Perry | |
| 2016/0027214 A1* | 1/2016 | Memmott | G02B 27/0172 345/633 |
| 2016/0170603 A1 | 6/2016 | Bastien et al. | |
| 2016/0179336 A1* | 6/2016 | Ambrus | G02B 27/017 715/768 |
| 2016/0232879 A1 | 8/2016 | Han et al. | |
| 2016/0378176 A1 | 12/2016 | Shiu et al. | |
| 2017/0228921 A1* | 8/2017 | Buhlmann | G06F 3/033 |
| 2017/0329419 A1* | 11/2017 | Dearman | G06F 3/0346 |
| 2017/0336882 A1* | 11/2017 | Tome | G06F 3/011 |
| 2018/0032131 A1* | 2/2018 | Yasuda | G06F 3/01 |
| 2018/0046245 A1* | 2/2018 | Schwarz | G02B 27/0093 |
| 2018/0101986 A1* | 4/2018 | Burns | G06T 19/006 |
| 2018/0173318 A1* | 6/2018 | Kim | G06T 7/20 |
| 2019/0073109 A1* | 3/2019 | Zhang | G06F 3/04812 |
| 2019/0079599 A1* | 3/2019 | Lee | G06F 3/011 |

OTHER PUBLICATIONS

Mobile VR Control Scheme with Gyro Mouse Part 1, www.youtube.com/watch?v=YSWYxWPiCA8&&index=1&list=1&listPL_tPOSxl4jG_G03mFRS9ZTCBzuAMJjREC; XP054977584 (Sep. 20, 2015).
European Search report dated Jan. 21, 2019; Ref #: P262678EP/OKS; Application #/Patent #: 18192681.7-1216.
European Office Action dated Apr. 16, 2020, issued in European Application No. 18192681.7.

* cited by examiner

METHOD FOR CONTROLLING POINTER IN VIRTUAL REALITY AND ELECTRONIC DEVICE

CROSS-REFERENCE TO RELATED APPLICATION(S)

This application is based on and claims priority under 35 U.S.C. § 119 of a Korean patent application number 10-2017-0115455, filed on Sep. 8, 2017, in the Korean Intellectual Property Office, the disclosure of which is incorporated by reference herein in its entirety.

BACKGROUND

1. Field

The disclosure relates to methods for controlling a pointer on a virtual reality screen by an external controller and electronic devices.

2. Description of Related Art

Generally, virtual reality (VR) refers to an environment or circumstance similar to a real-life environment as created by computer graphics and means an interface allowing a human being to feel it through his sense organ as if he interacts with it. The user may interoperate with virtual reality in real-time through device manipulation and may have a similar sensory experience to that in the real world.

Such virtual reality techniques may be easily or frequently encountered in various services, such as education, games, navigation, advertisements, or blog services through electronic devices supportive of the virtual reality services. For example, an electronic device may split one screen into a left-hand part and a right-hand part and display an image corresponding to the left eye and an image corresponding to the right eye on the left-hand part and the right-hand part, respectively, of the screen. Under development are display-couplable head mounted devices (HMDs) or head mounted displays (HMDs) allowing the user to view the images displayed on the split screen in the full view mode. As images corresponding to the user's eyes are provided in the full view mode, the user may receive virtual reality services.

An electronic device providing a virtual reality space may designate (pointing) a particular point within the virtual reality space or select or designate at least one object displayed in the virtual reality space using an HMD device or an external controller (e.g., a hand controller) interworking with the HMD device. For example, when the user wearing an HMD device turns his head or moves or manipulates an external controller in his hand, a particular point on the virtual reality screen provided by the HMD device may be designated or any one object displayed may be designated or selected.

Upon pointing to a particular point in the virtual reality space through the external controller interworking with the HMD device, it may be difficult to select a particular object with respect to the user's view angle because the reference position corresponding to the angle at which the user views the point in the virtual reality space (e.g., a virtual eye or a virtual camera) differs from the reference position corresponding to the external controller. For example, where at least some of a plurality of objects with different distances in the VR space overlap each other, an object which is not shown in the user's view field area (e.g., a field-of-view (FOV) area) may be selected, or when the point is moved by the external controller, the pointer may not be moved in a natural and seamless manner.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and electronic device for controlling a pointer in virtual reality which may select an object or display the pointer considering the user's view angle by allowing the pointer to be displayed at a point positioned within a designated distance from a reference position corresponding to an external controller interworking with a head mounted device (HMD) or an object to be selected based on the point positioned within the designated distance.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication circuit, at least one processor electrically connected with the display and the communication circuit, and a memory electrically connected with the at least one processor, wherein the memory may store instructions that instruct the at least one processor to receive a control signal from an external controller through the communication circuit, identify a direction based on at least the received control signal, determine a first position in a designated first distance range, which is away from a first reference position related to the external controller along the identified direction, in a virtual space displayed through the display, and control the display to display a pointer on a screen of the virtual space based on the first position.

In accordance with another aspect of the disclosure, an electronic device is provided. The electronic device includes a display, a communication circuit, at least one processor electrically connected with the display and the communication circuit, and a memory electrically connected with the at least one processor, wherein the memory may store instructions that instruct the at least one processor to receive a control signal from an external controller through the communication circuit, identify a direction based on at least the received control signal, determine a first position in a designated first distance range, which is away from a second reference position corresponding to a central point of a virtual space, which is displayed through the display, among positions on a line oriented from a first reference position related to the external controller along the identified direction, in the virtual space, and control the display to display a pointer on a screen of the virtual space based on the determined first position.

In accordance with another aspect of the disclosure, a method for controlling a pointer in virtual reality (VR) is provided. The method includes receiving a control signal from an external controller through a communication circuit of an electronic device, identifying a direction based on at least the received control signal, determining a first position in a designated first distance range, which is away from a first reference position related to the external controller along the identified direction, in a virtual space displayed through a display of the electronic device, and controlling the display to display the pointer on a screen of the virtual space based on the first position.

In accordance with another aspect of the disclosure, a method for controlling a pointer in virtual reality (VR) is provided. The method includes receiving a control signal from an external controller through a communication circuit of an electronic device, identifying a direction based on at least the received control signal, determining a first position in a designated first distance range, which is away from a second reference position corresponding to a central point of a virtual space, which is displayed through a display of the electronic device, among positions on a line oriented from a first reference position related to the external controller along the identified direction, in the virtual space, and controlling the display to display the pointer on a screen of the virtual space based on the determined first position.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
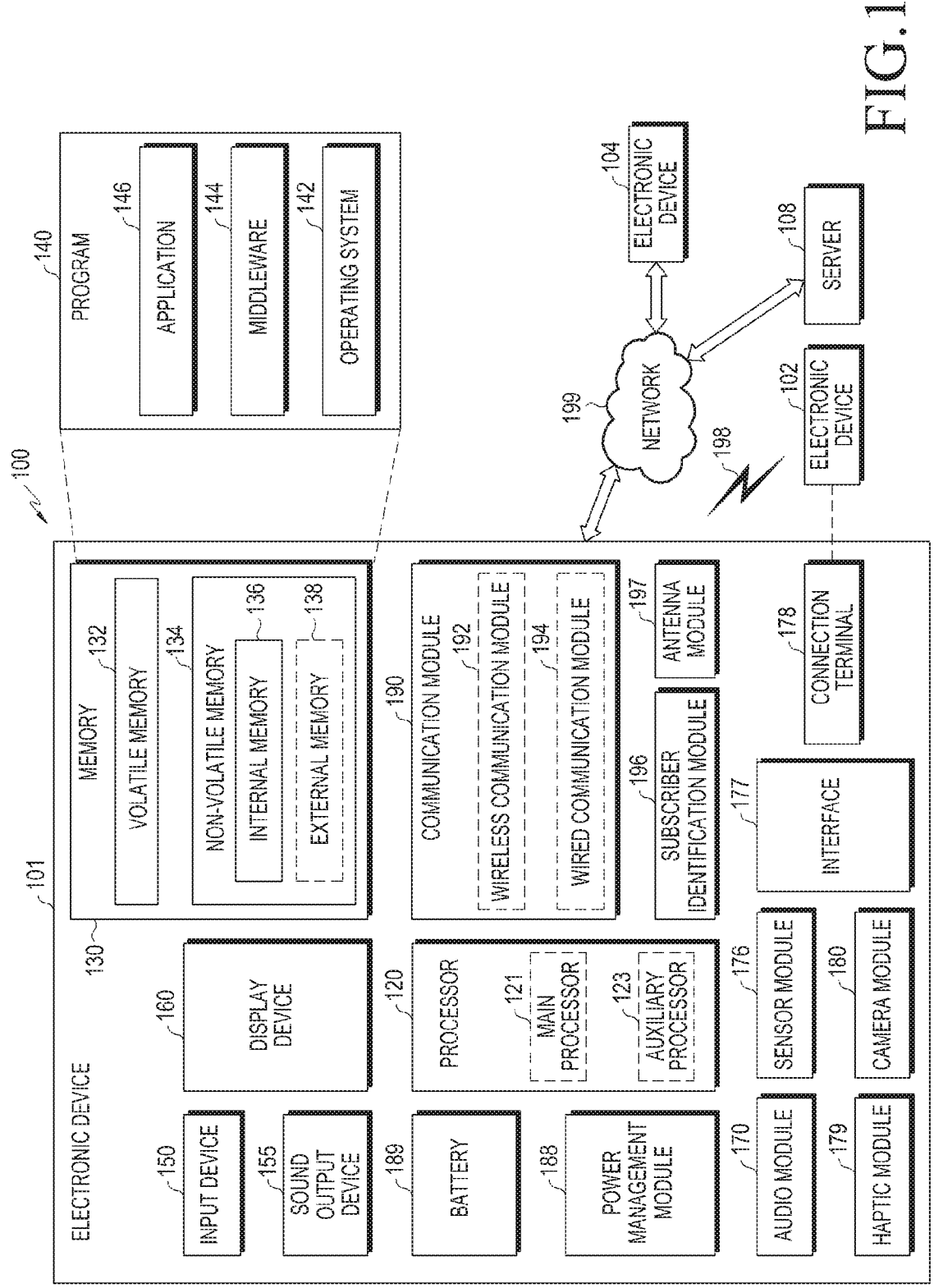
FIG. 1 is a view illustrating a network environment including electronic devices controlling a pointer in virtual reality (VR), according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element. The term "plurality" may mean at least two or more.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

For example, examples of the electronic device according to various embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or an HMD device. The HID device may include at least one of an accessory-type device (e.g., a watch, a ring, a bracelet, an anklet, a necklace, glasses, contact lenses, or a head-mounted device (HID) or head-mounted display (HID)), a fabric- or clothes-integrated device (e.g., electronic clothes), a body attaching-type device (e.g., a skin pad or tattoo), or a body implantable device. In some embodiments, examples of the smart home appliance may include at least one of a television (TV), a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to various embodiments of the disclosure, the electronic device may be flexible or may be a combination of the above-enumerated electronic devices. According to an embodiment, the electronic device is not limited to the above-listed embodiments. As used herein, the term "user" may denote a human or another device (e.g., an artificial intelligent electronic device) using the electronic device.

According to an embodiment, an omni-directional or multi-directional imaging camera system refers to a camera system that may capture images in all or some directions with respect to a fixed gaze point. An omni-directional image may include all the views that an observer can see when he or she spins in place and looks up or down. An omni-directional imaging camera system may capture images in all directions using a camera equipped with a specific type of mirror, e.g., a hyperboloid mirror, or multiple cameras. The camera may provide captured omni-directional image data to an electronic device or a server.

The image data or image data produced by various methods may be played or displayed on a wearable, head-mounted electronic device, e.g., an HMD, and when the HMD device is worn on the user's body portion (e.g., the user's head), the image data may be displayed on the screen. The HMD device may sense its acceleration, angular speed, or tilted direction and display, on the screen, image data (e.g., a partial image or image data corresponding to the field-of-view (FOV)) of the view direction corresponding to the sensed information among the image data. The HMD device may change and display screens corresponding to the user's motion. Therefore, the user may enjoy a lifelike experience by viewing the changing screens.

As used herein, 'image data' played on the electronic device and displayed on the screen may include data of which, at least, part corresponding to the orientation of the user or electronic device in the image may be displayed as a partial image on the screen according to the orientation. For example, the image data may include at least one of a virtual reality (VR) image, a 360-degree image, a panorama image, an animation, a cartoon, a still image, or a panorama picture.

As used herein, 'partial image' or 'FOV area (or observed FOV area)-corresponding image' may mean at least a partial image displayed on the screen corresponding to a designated direction among overall image data displayable in the image data. 'Partial image' or 'FOV area-corresponding image,' because it may mean an at least partial image displayed on the screen of the electronic device among the overall image data, may also be referred to as a 'displayed image' or 'displayed data'.

According to various embodiments, a reference position (denoted a "second reference position" below) corresponding to the central point of a virtual space for a screen area (e.g., a partial image or an image corresponding to the FOV area) displayed through the HMD device (or display) may correspond to the position of the user's eyes (or camera) viewing the screen area.

According to various embodiments, the electronic device may also be interpreted as an external device or external electronic device connected with the HMD device. The controller providing control information about the pointer in virtual reality displayed through the HMD device may provide the control information from the outside of the HMD device through a wired/wireless communication means and may be denoted an external controller for ease of description.

According to various embodiments, a reference position (which is denoted a "first reference position" below) related to the external controller in the VR space displayed through the HMD device (or display) may be determined as a relative position for the reference position corresponding to the central point of the VR space. For example, under the assumption that the user's eye is positioned in the reference position corresponding to the central point of the VR space, the reference position related to the external controller may be a relative position when the user holds the external controller in his hand. For example, the reference position related to the external controller may be set to a right and lower side (when the user holds the external controller in his right hand) of the reference position corresponding to the central point of the VR space or a left and lower side (when the user holds the external controller in his left hand) of the reference position.

According to various embodiments, at least one three-dimensional (3D) object may exist in the VR space. The external controller may be present as a virtual object in the VR space. According to various embodiments, a pointer may be generated in the position where a 3D object is hit by raycasting in the orientation of the external controller, and the hit object may be processed as having been selected. The user may identify the position of the generated pointer and manipulate the external controller to select his desired object.

According to various embodiments, 'raycast' may mean a function of sensing an object by drawing a virtual line like firing a laser beam in a particular orientation. According to various embodiments, an object hit within a predetermined distance may be determined by applying a raycast function to a designated direction from a particular reference position.

FIG. 1 is a block diagram illustrating an electronic device 101 in a network environment 100 including electronic devices according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one of the components or may add another component. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 (e.g., a connection terminal) may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth (BT), wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. Each electronic device 102 may be the same or different in type from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
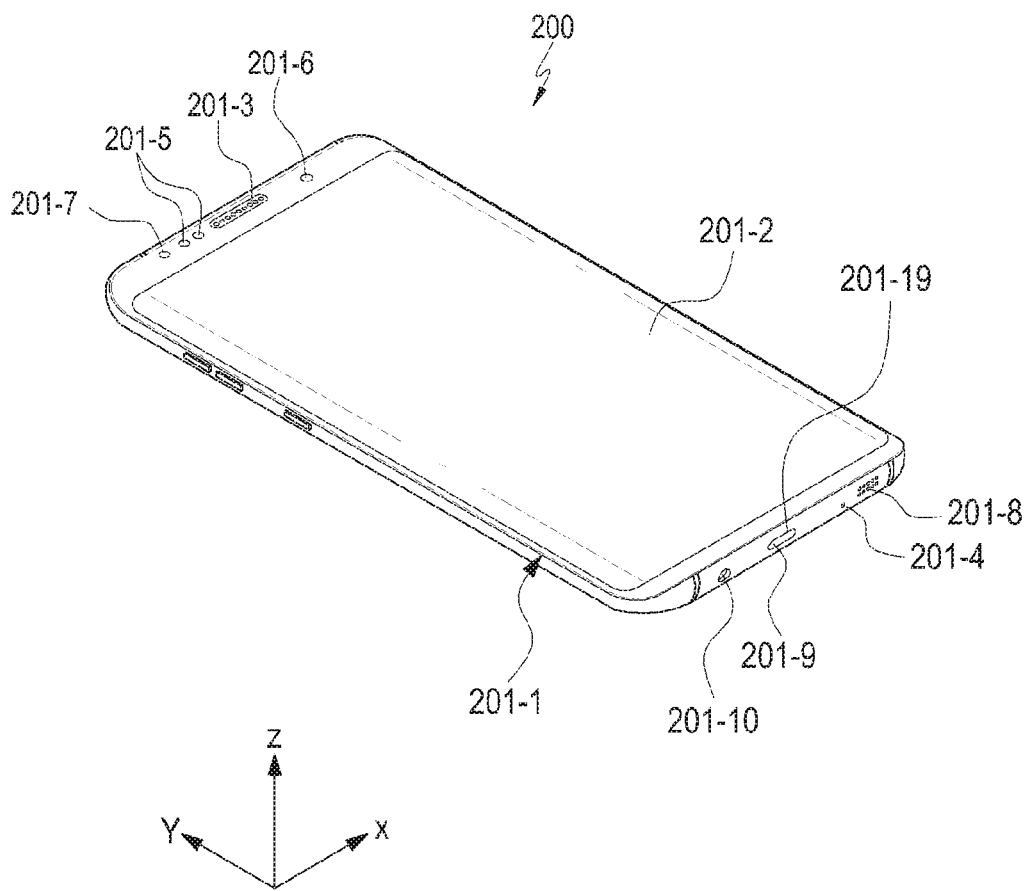
FIG. 2 is a perspective view illustrating an electronic device according to an embodiment of the disclosure.

FIG. 2 is a perspective view illustrating an electronic device according to an embodiment of the disclosure.

Referring to FIG. 2, in the three-axis rectangular coordinate system, 'X,' 'Y,' and 'Z,' respectively, may denote the width, length, and height direction of the electronic device 200 (e.g., the electronic device 101 of FIG. 1).

The electronic device 200 may include a housing 201-1. According to an embodiment, the housing 201-1 may be formed of a conductive and/or non-conductive member. According to an embodiment, the electronic device 200 may include a touchscreen display 201-2 (e.g., the display device 160 of FIG. 1) disposed to be exposed in at least part of the housing 201-1. According to an embodiment, the touchscreen display 201-2 may operate as a pressure-responsive touchscreen display including a pressure sensor. According to an embodiment, the electronic device 200 may include a receiver 201-3 disposed in the housing 201-1 to output the opposite party's voice. According to an embodiment, the electronic device 200 may include a microphone device 201-4 disposed inside the housing 201-1 to transmit the user's voice to the opposite party. According to an embodiment, the electronic device 200 may include an ear jack connector 201-10 disposed inside the housing 201-1 to allow an ear jack of an ear set to plug thereinto.

According to an embodiment, the electronic device 200 may include components that are disposed to be exposed in the touchscreen display 201-2 or to perform functions through the window without being exposed to perform various functions of the electronic device 200. According to an embodiment, the components may include at least one sensor module 201-5. The sensor module 201-5 may include, e.g., an illuminance sensor (e.g., an optical sensor), a proximity sensor (e.g., an optical sensor), an infrared (IR) sensor, an ultrasonic sensor, a fingerprint recognition sensor, or an iris recognition sensor. According to an embodiment, the components may include a camera device 201-6. According to an embodiment, the components may include an indicator 201-7 (e.g., a light emitting diode (LED) device) to visually provide state information about the electronic device to the user. According to an embodiment, at least one of the components may be disposed to be exposed through at least part of the housing 201-1.

According to an embodiment, the electronic device 200 may include a speaker device 201-8 disposed on a side of the microphone device 201-4. According to an embodiment, the electronic device may include a connector 201-9 (e.g., the connecting terminal 178 of FIG. 1) disposed on the opposite side of the microphone device 201-4 to enable connection to an external device. According to an embodiment, the connector 201-9 may be a socket-type connector.

According to an embodiment, an opening 201-19 may be formed in at least part of the housing 201-1 to expose the connector 201-9, and the connector 201-9 may be disposed in the opening 201-19. According to an embodiment, a header-type external connector may be coupled to the connector 201-9 in a forward or backward direction. According to an embodiment, the external connector may be connected to an external device. As the connector 201-9 couples to the external connector, the electronic device 200 may connect to the external device. According to an embodiment, the external device may be various external devices that may connect to the electronic device 200. For example, the external device may include an audio device, a computer, a charger, a memory, an electric fan, or an antenna (e.g., a digital multi-media broadcast antenna or frequency modulation (FM) antenna).

The plurality of electronic devices 200 may connect together via wired or wireless communication and operate. For example, a smartphone may couple with a wearable device, e.g., an HMD device, to provide content. For example, the smartphone and the wearable device, e.g., an HMD device, may couple together and operate.

According to an embodiment, the HMD device may be a device that is placed close to the user's eyes or worn on the user's head to display images. The HMD device may provide at least one of a see-through function for providing augmented reality (AR) or a see-closed function for providing virtual reality (VR). The see-through function may mean a function that delivers actual external images through the display to the user's eyes while providing in real-time additional information or images in a single video. The see-closed function may mean a function that provides content from the display in a video.

Hereinafter, in the description of performing operations related to controlling a pointer in the virtual reality of the HMD device, the electronic device may be interpreted as an external device or external electronic device connected to the HMD device. The controller providing control information about the pointer in virtual reality displayed through the HMD device may provide the control information from the outside of the HMD device through a wired/wireless communication means and may be denoted an external controller for ease of description.

Figure 3:
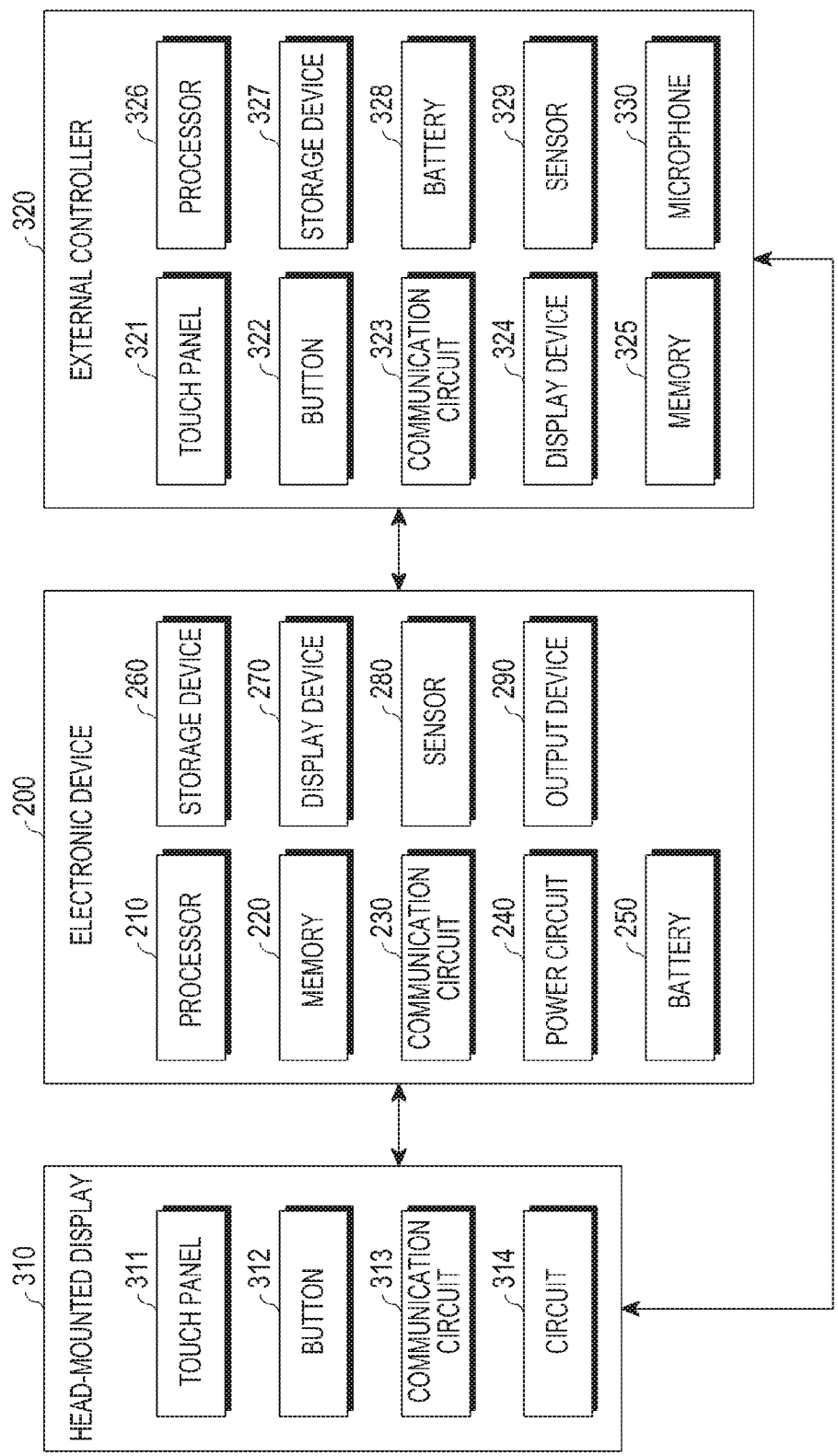
FIG. 3 is a block diagram illustrating a detailed structure of each device according to an embodiment of the disclosure.

FIG. 3 is a block diagram illustrating a detailed structure of each device according to an embodiment of the disclosure.

Referring to FIG. 3, according to an embodiment, the electronic device 200 (e.g., the electronic device 101 of FIG. 1) may communicate data with an HMD device 310 or an external controller 320, interoperating with the HMD device 310 or the external controller 320.

The electronic device 200 may include a processor 210 (e.g., the processor 120 of FIG. 1), a memory 220 (e.g., the memory 130 of FIG. 1), a communication circuit 230 (e.g., the communication module 190 of FIG. 1), a power circuit 240 (e.g., the power management module 188 of FIG. 1), a battery 250 (e.g., the battery 189 of FIG. 1), a storage device 260 (e.g., the internal memory 136 and/or the external memory 138 of FIG. 1), a display device 270 (e.g., the display device 160 of FIG. 1), a sensor 280 (e.g., the sensor module 176 of FIG. 1), and an output device 290 (e.g., the sound output device 155 of FIG. 1).

The processor 210 may include a graphic processor and an application processor. The graphic processor may visualize a virtual reality (VR) space on the display device 270 (e.g., a display). The application processor may execute various functions by one or more instructions stored in the memory 220.

The memory 220 may store various instructions that the processor 210 may execute. The electronic device 200 may further include the storage device 260, e.g., a micro secure digital (SD) card, separately from the memory 220.

The communication circuit 230 may include a wireless communication circuit (e.g., the wireless communication module 192 of FIG. 1) and a wired communication module (e.g., the wired communication module 194 of FIG. 1). The wireless communication may include cellular communication which uses at least one of, e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM). According to an embodiment, the wireless communication may include at least one of, e.g., Wi-Fi, light fidelity (Li-Fi), Bluetooth (BT), Bluetooth low power (BLE), zigbee, near field communication (NFC), magnetic secure transmission (MST), radio frequency, or body area network (BAN). According to an embodiment, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), ear jack, high definition multimedia interface (HDMI), recommended standard (RS)-232, power line communication (PLC), or plain old telephone service (POTS).

The power circuit 240 may be a module for managing power supplied to the electronic device 200. The power management module 188 may be configured as at least part of, e.g., a power management integrated circuit (PMIC). According to an embodiment, the power circuit may include a battery charging circuit that may be used to charge the battery 250 so that the battery 250 may be reused.

The display 270 may be a device for visually providing information to a user of the electronic device 200. The display device 160 may include, e.g., a display, a hologram device, or a projector and a control circuit for controlling the display, hologram device, or projector. According to an embodiment, the display device 270 may include touch circuitry or a pressure sensor capable of measuring the strength of a pressure for a touch.

The sensor 280 may include an inertia measurement unit (IMU). According to an embodiment, the IMU may include an accelerometer, a gyroscope, a magnetometer, and an altimeter.

The output device 290 may include, e.g., an audio module to audibly provide information to the user of the electronic device 200.

The HMD device 310 may include a touch panel 311 (e.g., the input device 150 of FIG. 1), a button 312 (e.g., the input device 150 of FIG. 1), a communication circuit 313 (e.g., the communication module 190 of FIG. 1), or a sensor 314 (e.g., the sensor module 176 of FIG. 1).

The touch panel 311, as an input module to be able to receive data from the user of the HMD device 310, may adopt at least one scheme of, e.g., a capacitive, resistive, infrared (IR), or ultrasonic scheme. The touch panel 311 may further include a control circuit. The touch panel 311 may further include a tactile layer and may provide a user with a tactile reaction.

The button 312, as an input module to be able to receive data from the user of the HMD device 310, may include, e.g., a physical key button, an optical key button, a trigger, or a keypad. The HMD device 310 may include a plurality of buttons, e.g., any one or more of a home button, a cancel button, up/down buttons, and left/right buttons. According to an embodiment, the HMD device 310 may set the respective corresponding functions of the plurality of buttons 312.

The communication circuit 313, as a module to transmit or receive data with another electronic device, may include a wireless communication circuit and a wired communication circuit. According to an embodiment, the communication circuit 230 of the electronic device 200 may apply.

The sensor 314 may measure the motion of the HMD device 310 by the user and may include, e.g., an IMU. According to an embodiment, the IMU may include a proximity sensor, an accelerometer, a gyroscope, a magnetometer, and an altimeter. According to an embodiment, the proximity sensor may be used to detect the user wearing the HMD device 310. According to an embodiment, the HMD device 310 may transmit various types of data obtained by the sensor 314 to the electronic device 200 using the communication circuit 313.

The external controller 320 may include a touch panel 321 (e.g., the input device 150 of FIG. 1), a button 322 (e.g., the input device 150 of FIG. 1), a communication circuit 323 (e.g., the communication module 190 of FIG. 1), a display device 324 (e.g., the display device 160 of FIG. 1), a memory 325 (e.g., the memory 130 of FIG. 1), a processor 326 (e.g., the processor 120 of FIG. 1), a storage device 327 (e.g., the memory 130 of FIG. 1), a battery 328 (e.g., the battery 189 of FIG. 1), a sensor 329 (e.g., the sensor module 176 ofFIG. 1), and a microphone 330 (e.g., the input device 150 of FIG. 1).

For the touch panel 321, as a module to receive data from the user of the external controller 320, according to an embodiment, the touch panel 311 of the HMD device 310 or the display device 270 of the electronic device 200 may apply.

The button 322 may be a module to receive data from the user of the external controller 320. According to an embodiment, the external controller 320 may include a plurality of buttons 322. For the button 322, e.g., the button 312 of the HIVID device 310 may apply.

The communication circuit 323, as a module to perform data communication with the electronic device 200 or the HID device 310, may include a wireless communication circuit and a wireless communication circuit. For example, the communication circuit 230 of the electronic device 200 may apply. According to an embodiment, the external controller 320 may transmit data obtained by the sensor 329 to the electronic device 200 using the communication circuit 323.

The display device 324, as a module to provide information to the user of the external controller 320, may include, e.g., a light emitting diode (LED).

The memory 325 may include various instructions that are executed to operate the processor 326 and may store a predetermined function corresponding to the button 322. According to an embodiment, a storage device 327 may be added separately from the memory 325.

Where the external controller 320 is wirelessly operated, the battery 328, as a module to supply power, may include, e.g., a secondary battery that is rechargeable.

The sensor 329 may be a module capable of detecting the motion of the external controller 320. For example, the sensor 314 of the HMD device 310 or the sensor 280 of the electronic device 200 may apply.

The microphone 330 may be a module to receive various sounds. The user may input voice commands through the microphone 330. According to an embodiment, voice data received by the microphone 330 may be transmitted to the electronic device 200 using the communication circuit 323.

According to an embodiment, an electronic device may comprise a display, a communication circuit, a processor electrically connected with the display and the communication circuit, and a memory electrically connected with the processor, wherein the memory may store instructions executed to enable the processor to receive a control signal from an external controller through the communication circuit, identify a direction based on at least the received control signal, determine a first position in a designated first distance range, which is away from a first reference position related to the external controller along the identified direction, in a virtual space displayed through the display, and control the display to display a pointer on a screen of the virtual space based on the first position.

According to an embodiment, the memory may store the instructions executed to control the processor to select at least one object on a line from a second reference position corresponding to a central point of the virtual space to the first position.

According to an embodiment, the memory may store the instructions executed to control the processor to select an object positioned within a shortest distance from the second reference position among the at least one object on the line from the second reference position to the first position.

According to an embodiment, the first reference position related to the external controller may be set considering a position of an arm of a user holding the external controller.

According to an embodiment, the memory may store the instructions executed to control the processor to display the pointer at a second position in a designated second distance range, which is away from a second reference position corresponding to a central point of the virtual space for a screen area displayed through the display towards the first position.

According to an embodiment, the memory may store the instructions executed to enable the processor to control the display of the pointer based on a distance between the selected object and the second reference position.

According to an embodiment, the memory may store the instructions executed to enable the processor to determine a size of the pointer based on the distance between the selected object and the second reference position.

According to an embodiment, the memory may store the instructions executed to control the processor to display whether the at least one object is selected.

According to an embodiment, an electronic device may comprise a display, a communication circuit, a processor electrically connected with the display and the communication circuit, and a memory electrically connected with the processor, wherein the memory may store instructions executed to enable the processor to receive a control signal from an external controller through the communication circuit, identify a direction based on at least the received control signal, determine a first position in a designated first distance range, which is away from a second reference position corresponding to a central point of a virtual space, which is displayed through the display, among positions on a line oriented from a first reference position related to the external controller along the identified direction, in the virtual space, and control the display to display a pointer on a screen of the virtual space based on the determined first position.

According to an embodiment, the memory may store the instructions executed to control the processor to select at least one object on a line from a second reference position to the first position.

Figure 4:
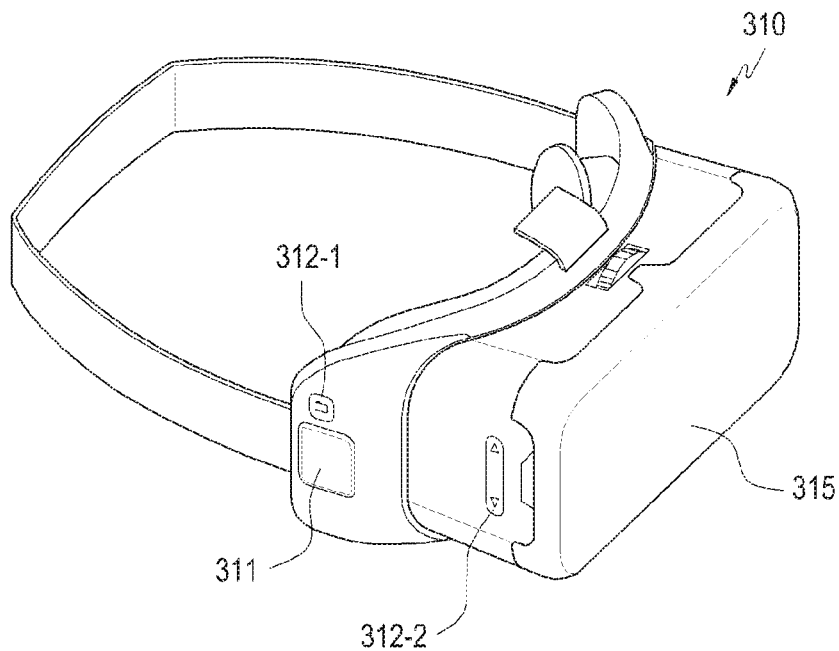
FIG. 4 is a view illustrating an example of a head mounted device (HIVID) according to an embodiment of the disclosure.

FIG. 4 is a view illustrating an example of an HMD device according to an embodiment of the disclosure.

Referring to FIG. 4, an HMD device 310 (e.g., the HMD device 310 of FIG. 2) may be implemented in various forms to be worn on the user's head.

According to an embodiment, the HMD device 310 may include a front cover 315 to visually provide the user with a VR space, a cancel key (back key) 312_1, a volume key 312_2 to control sound volume, and a touch pad 311 for the user's input. The user may manipulate the HMD device 310 by wearing the HMD device 310 and moving his head. According to an embodiment, the VR space may include a three-dimensional (3D) space. The user may see the whole space in the 360-degree directions from any position inside the VR space. According to an embodiment, the display of the electronic device 200 may provide, through the screen, an image of some area (e.g., a partial area or FOV area (or observed FOV area)) corresponding to the direction in which the HMD device 310 worn by the user points in the VR space according to the pointing direction of the HMD device 310.

Figure 5:
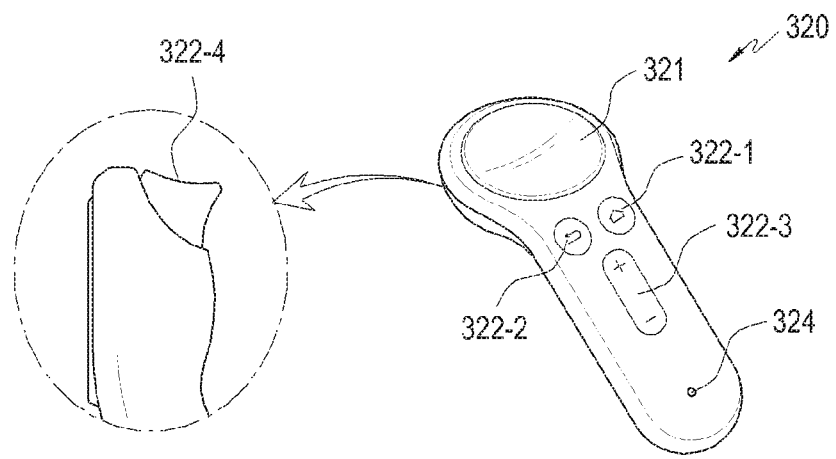
FIG. 5 is a view illustrating an example of an external controller according to an embodiment of the disclosure.

FIG. 5 is a view illustrating an example of an external controller according to an embodiment of the disclosure.

Referring to FIG. 5, the external controller 320 may be implemented in a form that the user manipulates using his body part (e.g., holding it in his hand), such as a remote controller. According to an embodiment, the external controller 320 may include a plurality of buttons 322, which, e.g., include a home button 322_1 for displaying a display screen, a cancel button 322_2 for displaying the prior screen of the screen currently displayed, a volume button 322_3 for adjusting sound volume, a trigger button 322_4 for selecting the display object pointed at, or a touch pad 321 for the user's input as shown in FIG. 5.

According to an embodiment, the user may change screens on the display by the home button 322_1 and the cancel button 322_2, adjust the volume of the sound played by the volume button 322_3, and move a pointer or object displayed within the user's FOV area in the VR space by manipulating the touch pad 321. According to an embodiment, when the user manipulates the external controller 320 by moving the external controller 320 in his hand, the position pointed at in the VR space may be moved corresponding to the movement of the external controller 320.

According to an embodiment, the HMD device 310 shown in FIG. 4 or the external controller 320 shown in FIG. 5 may be used to perform various operations, such as displaying a display screen (e.g., the FOV area for the VR space) of the electronic device 200, moving the screen on the display or selecting an object within the user's FOV area, or moving or deleting an object.

Figure 6:
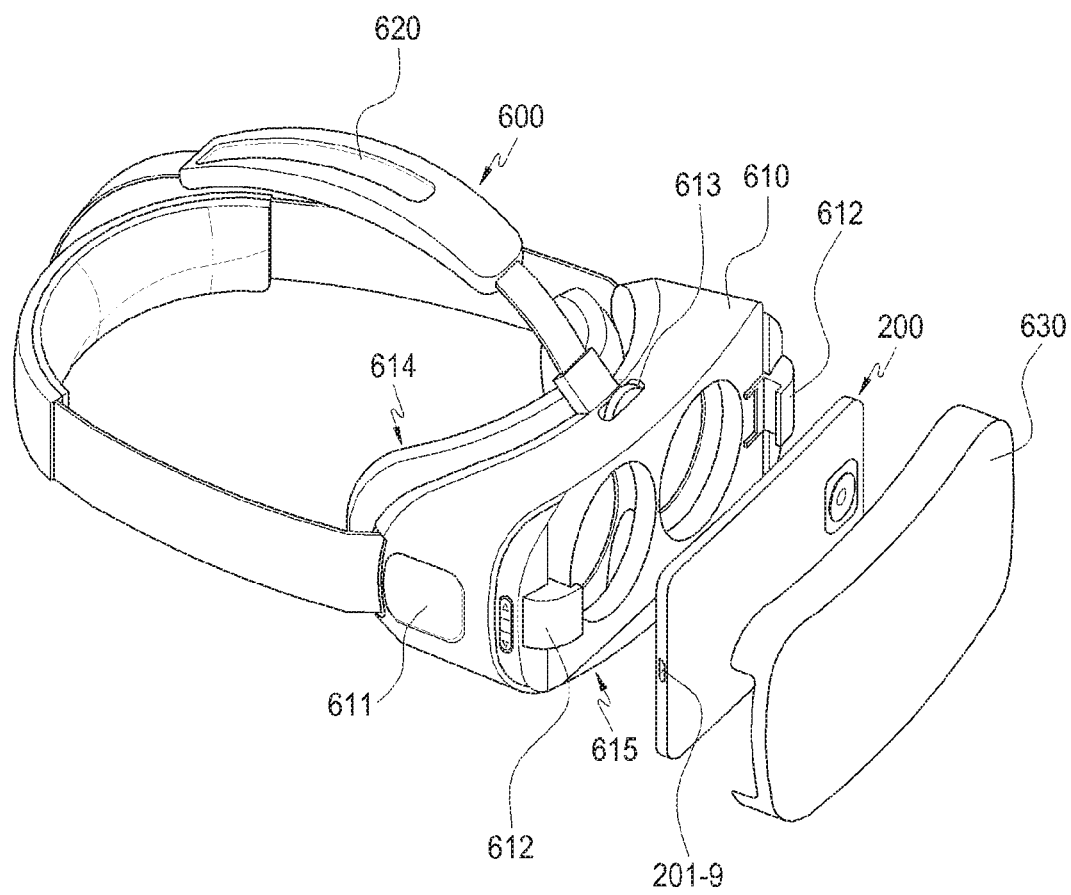
FIG. 6 is a view illustrating an example of mounting an electronic device on an HMD device according to an embodiment of the disclosure.

FIG. 6 is a perspective view illustrating an HMD device according to an embodiment of the disclosure.

Referring to FIG. 6, an HMD device 600 may include a main frame 610 configured to be detachably connected with an electronic device 200, e.g., a smartphone (e.g., the electronic device 200 of FIG. 2) and a mount 620 connected with the main frame 610 to fasten the main frame 610 to the user's body part.

The main frame 610 may include a user input module 611 for controlling the electronic device 200, a first interface unit 612 connected with a connector 201-9 of the electronic device 600, a display position adjuster 613, a proximity sensor 614, or a second interface unit (not shown) connected with an external power supply or another external input device.

According to an embodiment, the user input module 611 may include at least one of a physical key, a physical button, a touch key, a joystick, a wheel key, or a touch pad. When the user input module 611 is a touch pad, the touch pad may be disposed on a side surface of the main frame 610. The touch pad may include a control object (e.g., a graphical user interface (GUI) for controlling sound or image) to represent the function of the electronic device 200 or the HMD device 600.

The first interface unit 612 may support the HMD device 600 to communicate with the electronic device 200. The first interface unit 612 may be connected to an interface unit (e.g., a universal serial bus (USB) port) of the electronic device 200. The first interface unit 612 may transfer a user input signal generated from the user input module 611 to the electronic device 200. For example, the first interface unit 612 may transmit a user input signal (e.g., a touch input) received from the user input module 611 to the electronic device 200. The electronic device 200 may perform a function corresponding to the user input signal. For example, the electronic device 200 may adjust volume or play video in response to the touch input.

The proximity sensor 614 may contactlessly (i.e., without contact) sense approach of an object to detect the position of the object. For example, upon sensing an object (e.g., the user's body part) within a preset sensing distance, the proximity sensor 614 may transfer a sensed signal to the main controller of the HMD device 600. Upon failure to sense an object within the predetermined sensing distance, the proximity sensor 614 may send no signal to the main controller. The main controller may determine that the user wears the HMD device 600 based on the signal sensed by the proximity sensor 614. To easily detect whether the HMD device 600 is worn, the proximity sensor 614 may be provided on an upper portion of the inside of the main frame 610 to be placed adjacent to the user's forehead when the user wears the HMD device 600.

Although the proximity sensor is used herein, other sensors capable of detecting whether the HMD device 600 is worn may alternatively be used. For example, at least one or more of an acceleration sensor, a gyro sensor, a geomagnetic sensor, a gesture sensor, a bio (or biometric) sensor, a touch sensor, an illumination (or illuminance) sensor, or a grip sensor may be mounted in the main frame 610.

The main frame 610 may be configured to be detachably coupled with an external device, e.g., the electronic device 200. For example, the main frame 610 may include a space, structure, or cavity for receiving the electronic device 200. The part of the main frame 610 forming the space may include an elastic material. The part of the main frame 610 forming the space may be, at least partially, formed of a flexible material to change the size or volume of the space depending on various sizes of devices to be received in the space.

A face contact part may be added on the rear surface (inner surface) of the main frame 610. A lens assembly including at least one lens may be inserted into part of the face contact part in the position facing the user's eyes. In the lens assembly, a display or transparent/translucent lens may be integrally or detachably formed with the face contact part. Part of the face contact part may include a nose recess shaped to seat the user's nose thereon.

According to an embodiment, the main frame 610 may be formed of a material, e.g., plastic, to give the user a comfortable feeling upon wearing and to support the electronic device 200. Alternatively, the main frame 610 may be formed of at least one material of glass, ceramic, metal (e.g., aluminum), or a metal alloy (e.g., a steel, stainless steel, titanium, or magnesium alloy) for better strength or appearance.

The mount 620 may be worn on the user's body part. The mount 620 may be formed of an elastic band. According to an embodiment, the mount 620 may include eyeglass temples, a helmet, or straps.

According to an embodiment, the HMD device 600 may further include a cover 630 to fasten the electronic device 200 which is coupled with the main frame 610. The cover 630 may be coupled to the main frame 610 physically as is a hook or by way of magnets or electromagnets. The cover 630 may prevent the electronic device 200 from escaping off the main frame 610 due to the user's motion and protect the electronic device 200 from external impacts.

The main frame 610 and the display of the electronic device 200 may be coupled together facing each other. The user may couple the HMD device 600 with the electronic device 200 by putting the connector 201-9 of the electronic device 200 into the first interface unit 612 of the main frame 610 and then fitting the cover 630 thereover.

According to an embodiment, a connector 615 to which an external device (e.g., a power supply) may connect may be formed on a side (e.g., bottom) of the main frame 610 of the HMD device 600.

Figure 7:
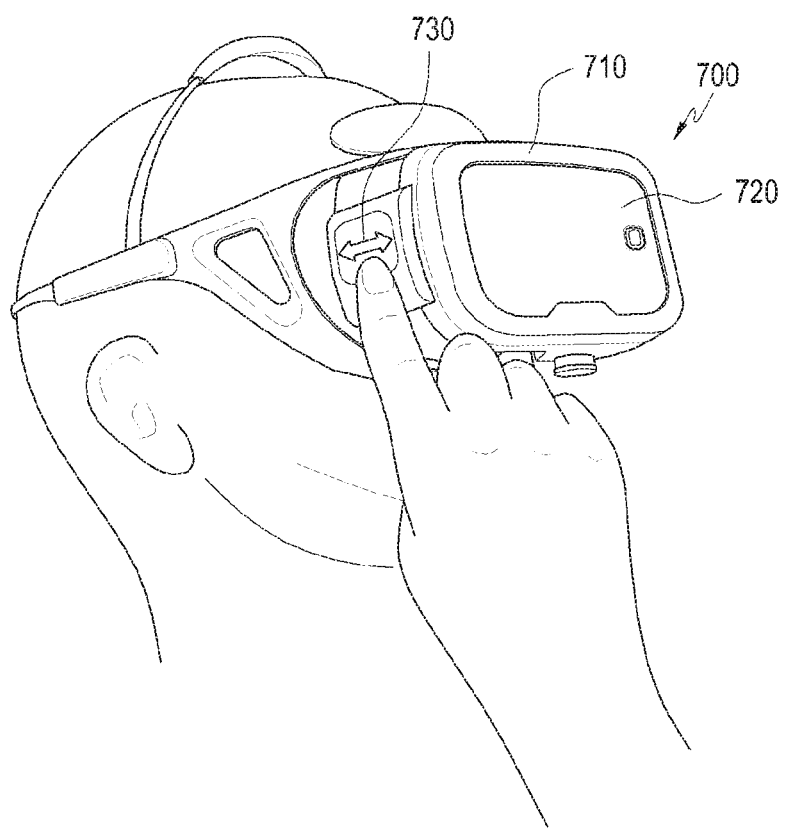
FIG. 7 is a view illustrating an example of mounting an electronic device on an HMD device according to an embodiment of the disclosure.

FIG. 7 is a view illustrating an example in which a user wears an HMD device 700 on which an electronic device 720 (e.g., the electronic device 200 of FIG. 2 or the electronic device 200 of FIG. 6) is mounted, according to an embodiment of the disclosure.

Referring to FIG. 7, the user may put the electronic device 720-mounted HMD device 700 on his head. The user may view the screen of the display of the electronic device 720 through the lenses of the HMD device 700.

Further, as shown in FIG. 7, the user may control the functions of the electronic device 720 or the functions of the HMD device 700 through the touch pad 730 provided on a side surface of the main frame 710 of the wearable device 700. According to an embodiment, the display of information in the VR mode may be implemented on, e.g., a smartphone or mobile phone, and on an HMD device (e.g., the HMD device 700) as well.

Figure 8:
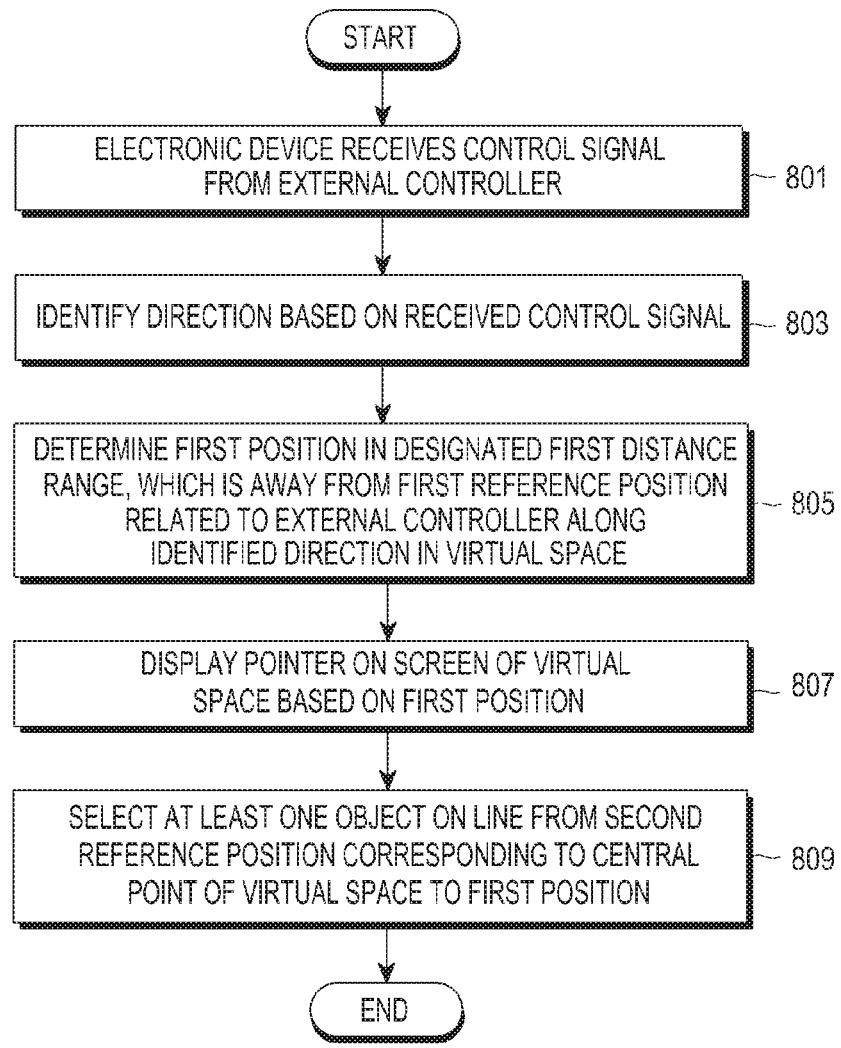
FIG. 8 is a flowchart illustrating a procedure for controlling a pointer in VR according to an embodiment of the disclosure.

FIG. 8 is a flowchart illustrating a procedure for controlling a pointer in VR according to an embodiment of the disclosure.

Referring to FIG. 8, an electronic device (e.g., the electronic device 101, 102, or 104 of FIG. 1, the electronic device 200 of FIG. 2, or the electronic device 200 of FIG. 3) mounted on an HMID device (e.g., the HMID device 310 of FIG. 3, the HMID device 310 of FIG. 4, the HMID device 600 of FIG. 6, or the HMID device 700 of FIG. 7) may receive a designated control signal from an external controller (e.g., the external controller 320 of FIG. 3 or the external controller 320 of FIG. 5) through a communication circuit in operation 801.

In operation 803, the electronic device (e.g., a processor (e.g., the processor 120 of FIG. 1 or the processor 210 of FIG. 3) of the electronic device) may identify the direction based on at least the received control signal.

In operation 805, the electronic device may determine a first point positioned in the identified direction within a designated first distance (or a first distance range) from a first reference position related to the external controller in a virtual space displayed through the display.

In operation 807, the electronic device (e.g., the processor of the electronic device) may control the display to display a pointer on the screen of the virtual space based on the determined first point.

In operation 809, the electronic device (e.g., the processor of the electronic device) may perform control to select at least one object positioned on a line from a second reference position corresponding to a central point of the virtual space for a screen area displayed through the display to the first point.

According to an embodiment, a method for operating an electronic device may comprise receiving a control signal from an external controller through a communication circuit of the electronic device, identifying a direction based on at least the received control signal, determining a first position in a designated first distance range, which is away from a first reference position related to the external controller along the identified direction, in a virtual space displayed through a display of the electronic device, and controlling the display to display the pointer on a screen of the virtual space based on the first position.

According to an embodiment, the method may further comprise performing a control to select at least one object on a line from a second reference position corresponding to a central point of the virtual space to the first position.

According to an embodiment, the method may further comprise performing a control to select an object positioned within a shortest distance from the second reference position among the at least one object on the line from the second reference position to the first position.

According to an embodiment, the first reference position related to the external controller may be set considering a position of an arm of a user holding the external controller.

According to an embodiment, the method may further comprise performing a control to display the pointer at a second position in a designated second distance range, which is away from a second reference position corresponding to a central point of the virtual space for a screen area displayed through the display towards the first position.

According to an embodiment, the method may further comprise controlling the display of the pointer based on a distance between the selected object and the second reference position.

According to an embodiment, the method may further comprise determining a size of the pointer based on the distance between the selected object and the second reference position.

According to an embodiment, the method may further comprise performing a control to display whether the at least one object is selected.

According to an embodiment, a method for operating an electronic device may comprise receiving a control signal from an external controller through a communication circuit of the electronic device, identifying a direction based on at least the received control signal, determining a first position in a designated first distance range, which is away from a second reference position corresponding to a central point of a virtual space, which is displayed through the display, among positions on a line oriented from a first reference position related to the external controller along the identified direction, in the virtual space, and controlling a display of the electronic device to display the pointer on a screen of the virtual space based on the determined first position.

According to an embodiment, the method may further comprise performing a control to select at least one object on a line from the second reference position to the first position.

Figure 9:
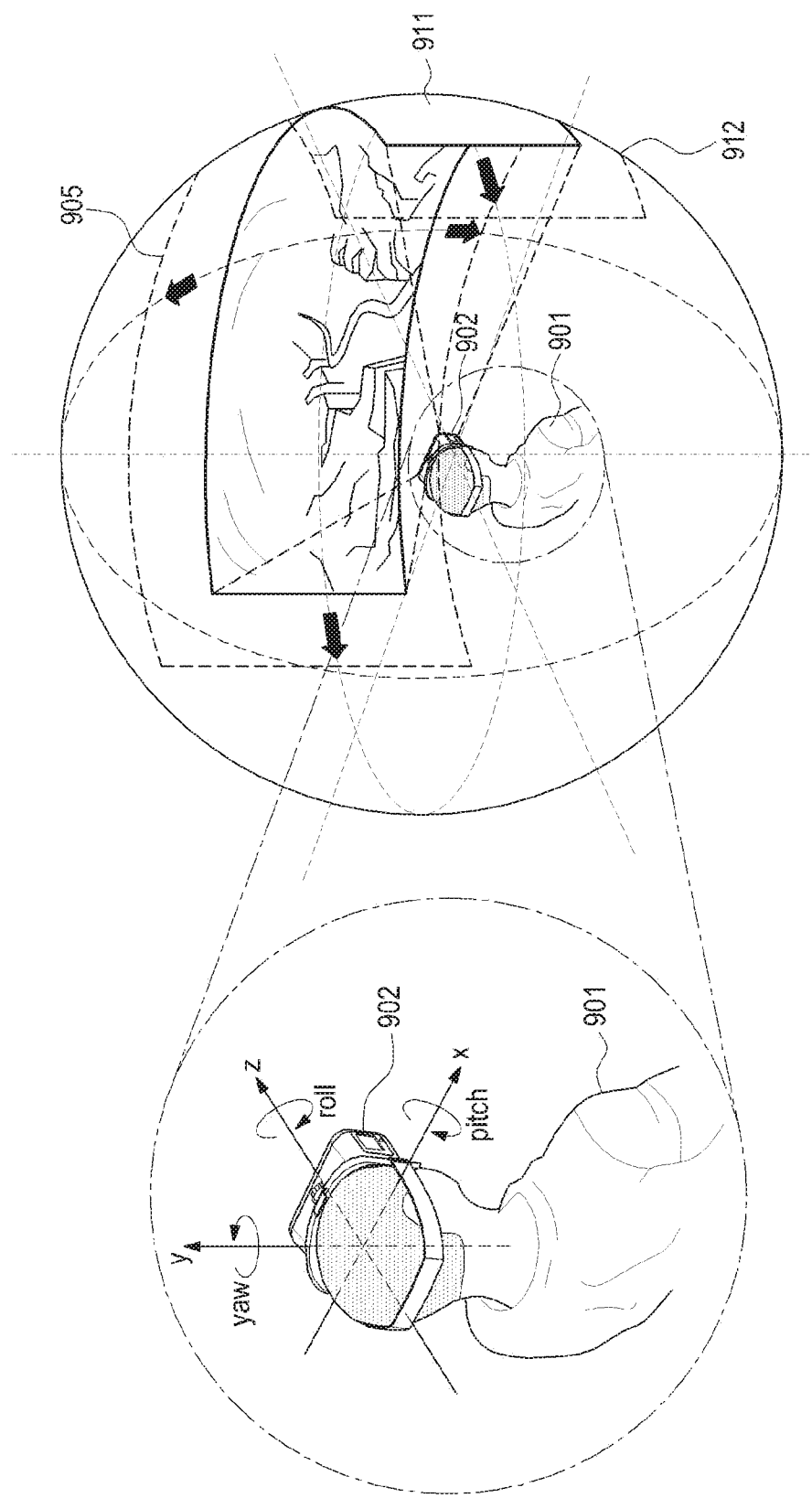
FIG. 9 is a view illustrating an example of a screen displayed on an HMD device according to an embodiment of the disclosure.

FIG. 9 is a view illustrating an example of a screen displayed on an HMD device when a user wears the HMD device according to an embodiment of the disclosure.

Referring to FIG. 9, the user 901 may put the housing of the wearable device on her head. The wearable device may be coupled with the electronic device 902. The user may view a screen on a virtual space displayed on the display of the electronic device 902.

The electronic device 902 may display an image of the virtual space. The image of the virtual space may include at least one object. The user may identify the image of the virtual space by turning around at 360 degrees. The user 901 may view the VR screen (the VR screen) by observing the images on her eyes. The VR screen displayed on the electronic device 902 may be varied and displayed by the motion (yaw, pitch, or roll) of the user 901, the electronic device 902, or the HMD device.

According to an embodiment, the display of the electronic device 902 may output a screen 911 in the HMD mode. The HMD mode screen 911 may be a display screen configured in a 3D stereoscopic image and may be a partial image corresponding to an area corresponding to a designated direction of the electronic device 902. For example, when the user 901 lets his face up, the electronic device 902 may move up accordingly, and the electronic device 902 may display a screen 905, of the HMD mode screen 911, which corresponds to an upper region with respect to the reference position.

According to an embodiment, the HMD device or the electronic device 902 mounted on the HMD device may sense the acceleration, angular speed, or tilted direction and display, on the HMD mode screen 911, image data (e.g., a partial image or image data corresponding to the FOV area) of the view direction corresponding to the sensed information. The HMD may change and display screens 912 corresponding to the user's motion. Therefore, the user may enjoy a lifelike experience by viewing the changing screens.

According to an embodiment, a reference position (second reference position) corresponding to the central point of a virtual space for a screen area (e.g., a partial image or an image corresponding to the FOV area) displayed through the HMD device (or display) may correspond to the position of the eyes of the user 901 (or camera) viewing the screen area.

Figure 10:
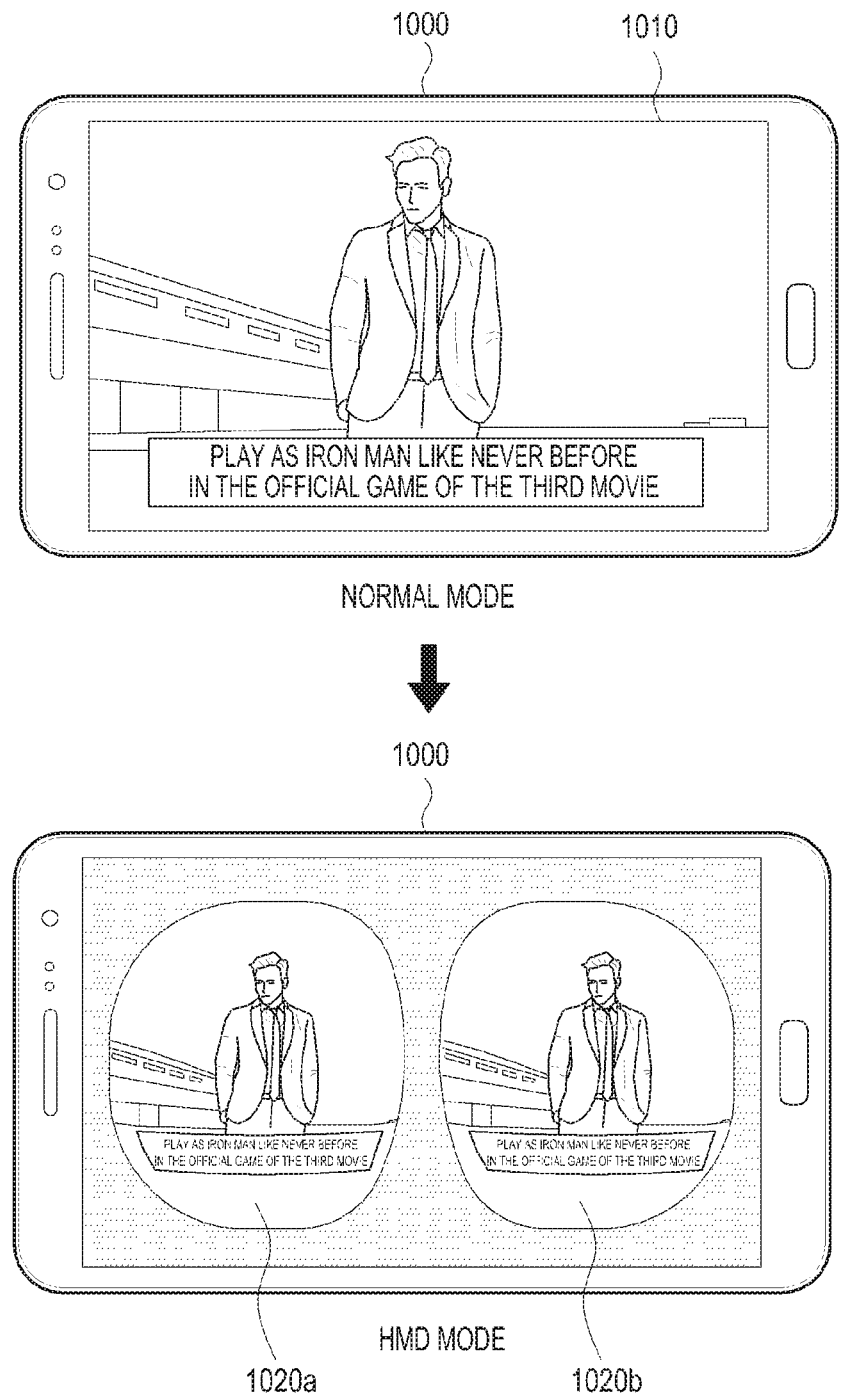
FIG. 10 is a view illustrating a screen mode of an electronic device according to an embodiment of the disclosure.

FIG. 10 is a view illustrating a screen mode of an electronic device according to an embodiment of the disclosure.

Referring to FIG. 10, an electronic device 1000 may be, e.g., the electronic device 101, 102, or 104 of FIG. 1, the electronic device 200 of FIG. 2, or the electronic device 200 of FIG. 3. When the electronic device 1000 operates in a normal mode, it may display one operation screen 1010 as shown on the upper part of FIG. 10.

According to an embodiment, when the electronic device 1000 is mounted on an HMD device, it may be operated in a VR mode (e.g., an HMD mode) as shown on the lower part of FIG. 10. When the electronic device 1000 is operated in the VR mode, a screen 1020a corresponding to the user's left eye and another screen 1020b corresponding to the user's right eye may be separately displayed. In the screen of the VR mode, one image may be separately displayed as two images 1020a and 1020b.

The above-described electronic devices or HMD devices are examples of devices capable of displaying image data according to various embodiments, but various embodiments of the disclosure are not limited thereto. For example, various embodiments of the disclosure may apply to any type of device capable of displaying image data.

Figure 11:
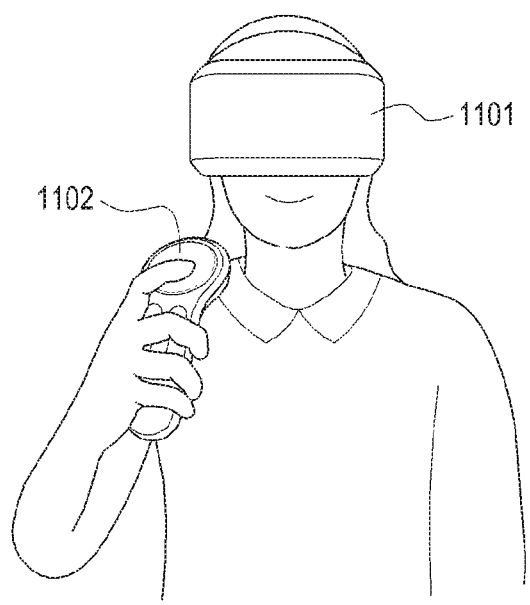
FIG. 11 is a view illustrating an example of controlling an HMD device by an external controller while wearing the HMD device according to an embodiment of the disclosure.

FIG. 11 is a view illustrating an example of controlling an HMD device by an external controller while wearing the HMD device according to an embodiment of the disclosure.

Referring to FIG. 11, an electronic device providing a virtual reality space may designate (pointing) a particular point within the virtual reality space or select or designate at least one object displayed in the virtual reality space using an HMD device 1101 or an external controller 1102 (e.g., a hand controller) interworking with the HMD device 1101. For example, when the user wearing the HMD device 1101 moves his head or moves or manipulates the external controller 1102 in his hand, a particular point on the virtual reality screen provided by the HMD device 1101 may be designated or any one object displayed may be designated or selected.

Figure 12:
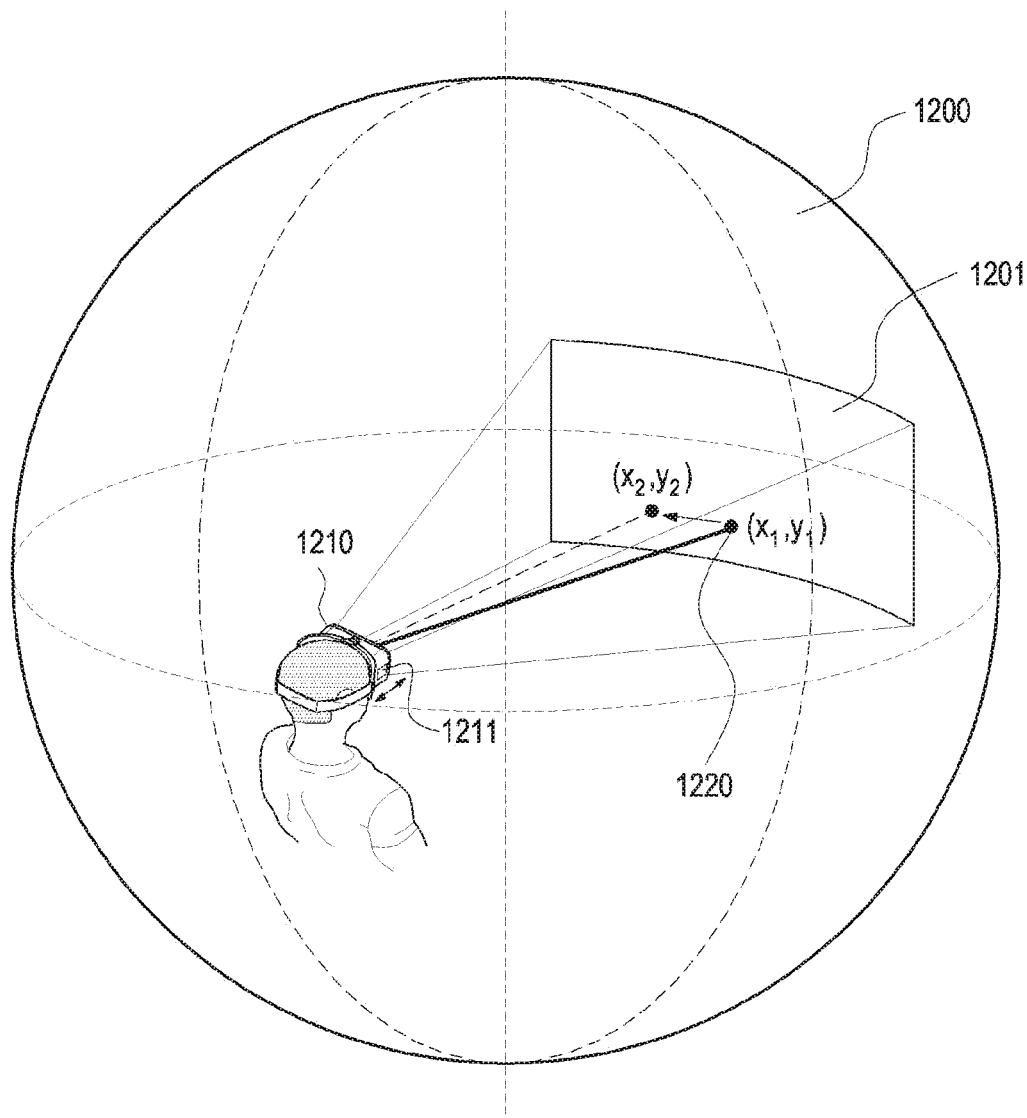
FIG. 12 is a view illustrating a method for controlling a pointer using an HMD device according to an embodiment of the disclosure.

FIG. 12 illustrates an example in which an electronic device (e.g., the electronic device 200 of FIG. 2) points at a particular position within a user's view FOV area using an HMD device 1210 according to an embodiment of the disclosure.

The electronic device may point at any position within the VR space 1200 as the user wearing the HMD device 1210 manipulates the HMD device 1210. According to an embodiment, the electronic device may point at a particular position in the VR space 1200 to which the HMD device 1210 is pointing, based on the position or angle (direction) of the HMD device 1210. The pointed-at position may be a particular position at which the HMD device 1210 is pointing in the VR space 1200. According to an embodiment, the VR space 1200 may be displayed in the form of a sphere as shown in FIG. 12, and an image may be displayed on the surface of the sphere.

Referring to FIG. 12, where the FOV area 1201 of the VR space 1200 displayed to the user is a plane constituted of the coordinates (0,0), (0, y_FOV), (x_FOV, 0), and (x_FOV, y_FOV), the position at which the HMD device 1210 points may be p_head_controller (x, y). For example, the electronic device may point the HMD device 1210 to a particular one among a plurality of objects displayed in the user's FOV area 1201 by manipulating the pointing position. According to an embodiment, p_head_controller may correspond to the central point of the user's FOV area. According to an embodiment, since the VR space is a 3D space, the user's FOV area 1201 may be provided to the user in a 3D shape.

According to an embodiment, the electronic device may control the display to display a pointer icon at the coordinates in the user's FOV area 1201 corresponding to the position 1220 at which the HMD device 1210 points.

According to an embodiment, where the user wearing the HMD 1210 moves her head left/right or up/down, the electronic device may change the user's FOV area 1201 depending on the pointed-at position. For example, the position 1220 at which the HMD device 1210 points may be the central point $(x_1, y_1)$ of the user's FOV area 1201. As another example, the electronic device may move the pointed-at position 1220 displayed in the user's FOV area 1201 from $(x_1, y_1)$ to $(x_2, y_2)$ using the touchpad 1211 included in the HMD device 1210. For example, the position 1220 at which the HMD device 1210 points may not be the central point of the user's FOV area 1201.

Figure 13:
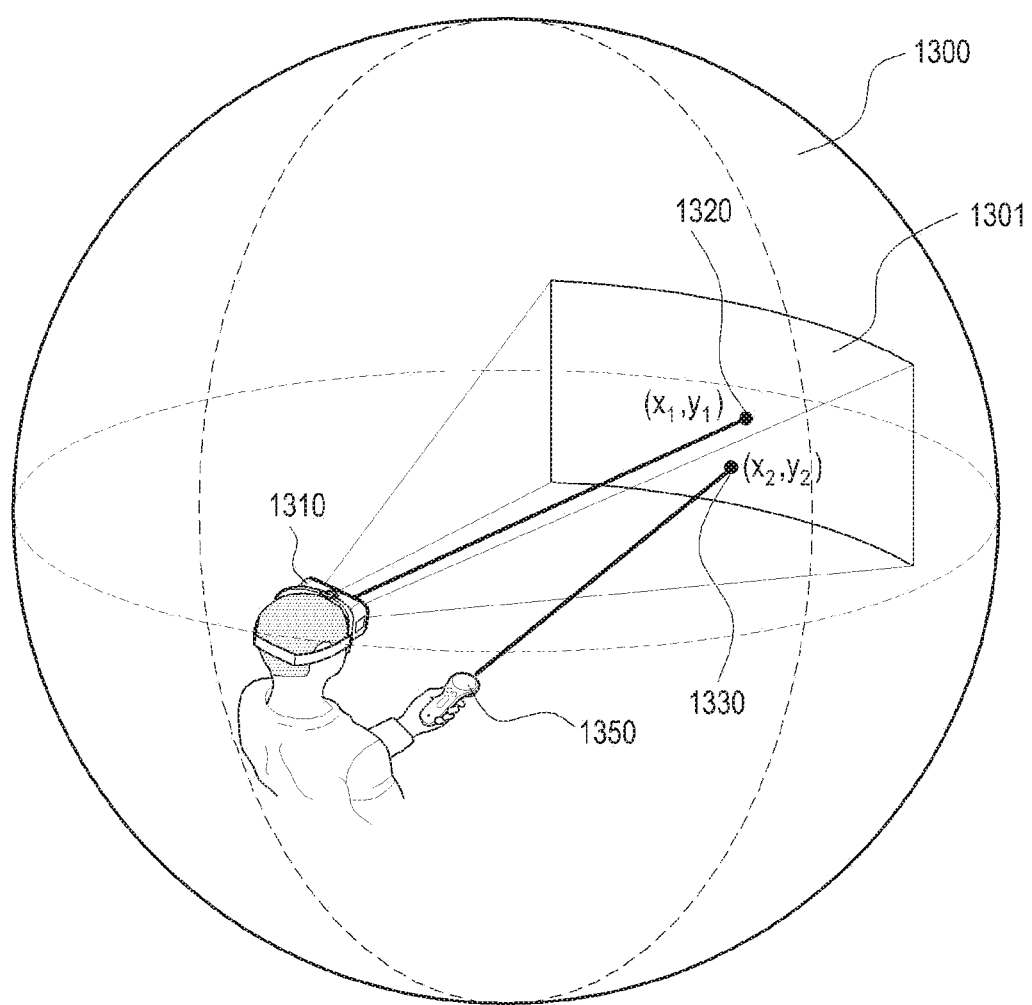
FIG. 13 is a view illustrating a method for controlling a pointer using an external controller according to an embodiment of the disclosure.

FIG. 13 illustrates an example in which an electronic device (e.g., the electronic device 200 of FIG. 2) points at a particular position within a user's view FOV area 1301 using an external controller 1350 according to an embodiment of the disclosure.

Referring to FIG. 13, according to an embodiment, where the user manipulates the external controller 1350 with the external controller 1350 in her hand, the electronic device may point at any position in the user's FOV area 1301 of the VR space 1300 based on at least the orientation of the external controller 1350. According to an embodiment, the electronic device may point at a particular position in the VR space 1300 based on the position of the external controller 1350 or the angle (direction) at which the external controller 1350 is oriented as shown in FIG. 13. For example, the particular position may be the position at which the external controller 1350 points. Where the user's FOV area 1301 of the VR space 1300 displayed on the electronic device is a plane constituted of the coordinates (0, 0), (0, y_FOV), (x_FOV, 0), and (x_FOV, y_FOV), the position 1330 at which the external controller 1350 points may be p_hand_controller (x, y). For example, the electronic device may point at a particular object among a plurality of objects displayed in the user's FOV area 1301 depending on the direction that the external controller 1350 indicates.

According to an embodiment, the user's FOV area 1301 shown in FIG. 13 may be the same as the user's FOV area 1201 shown in FIG. 12. According to an embodiment, the user's FOV area 1301 may be determined as at least a partial area of the VR space 1300 with respect to the position or angle of the HMID device 1310.

According to an embodiment, the electronic device may control the display to display a pointer (or a pointer icon) at coordinates in the user's FOV area 1301 corresponding to the position 1330 at which the external controller 1350 points.

According to an embodiment, where the position or orientation of the external controller 1350 is changed, the electronic device may move the pointed-at position 1330, based on the position and direction of the external controller 1350. The electronic device may move the pointed-at position 1330 displayed in the user's FOV area 1301 from, e.g., $(x_2, y_2)$ to another position 1320 (e.g., $(x_1, y_1)$) using the touchpad included in the external controller 1350. According to an embodiment, the electronic device may display a pointer (or a pointer icon) at the pointed-at position 1330 in the user's FOV area 1301.

According to an embodiment, the electronic device may display, through the FOV area 1301, at least part of a lead line from the position 1330 pointed at by the external controller 1350 to the position 1330 pointed at by the external controller 1350 in the VR space 1300 as shown in FIG. 13.

Figure 14:
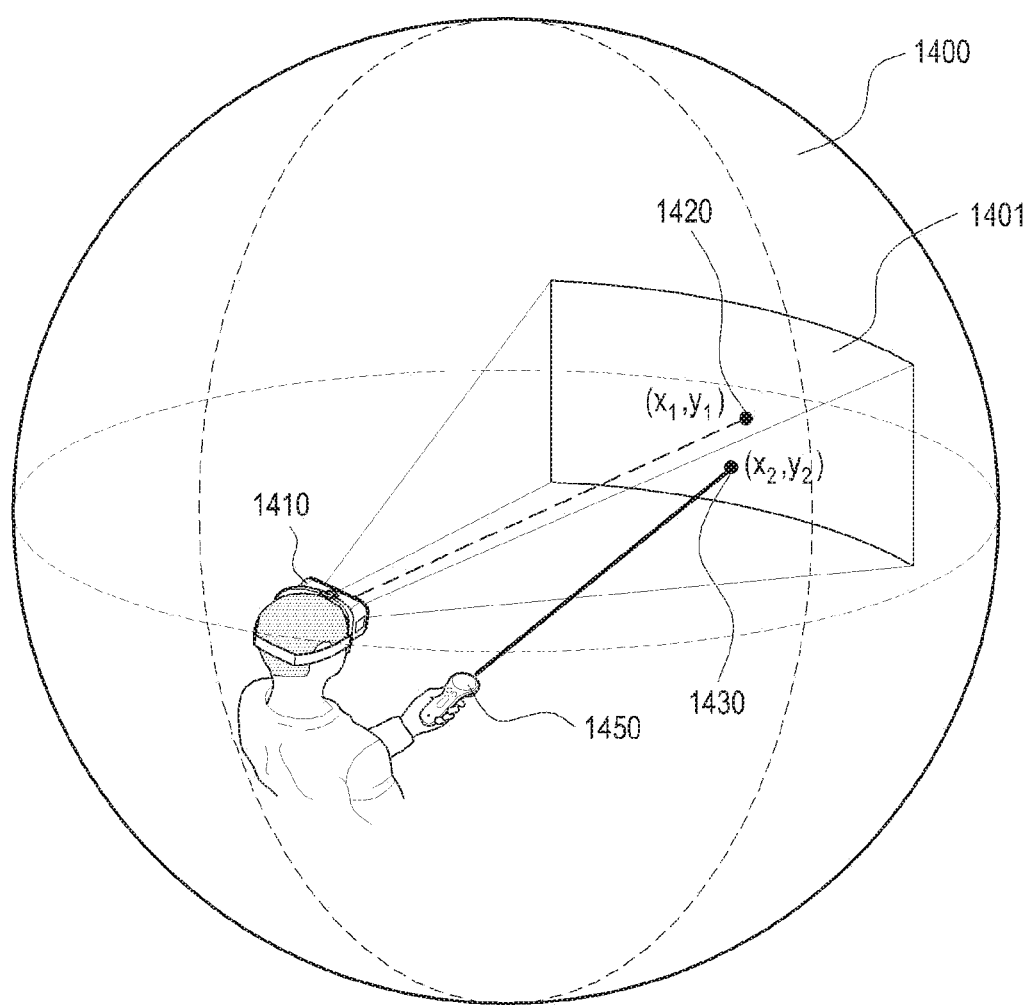
FIG. 14 is a view illustrating a method for controlling a pointer using an external controller according to an embodiment of the disclosure.

FIG. 14 illustrates an example in which an electronic device (e.g., the electronic device 200 of FIG. 2) points at a particular position 1430 within a user's view FOV area 1401 using an external controller 1450 according to an embodiment of the disclosure.

According to an embodiment, where a plurality of objects may be included in the VR space 1400, and an area in the VR space 1400 that the user may view is the user's FOV area 1401, the electronic device 200 may control the plurality of objects displayed in the user's FOV area 1401 using the external controller 1450.

Referring to FIG. 14, when the user wears the HMD device 1410 and grabs the external controller 1450 to manipulate the HMD device 1410 and/or the external controller 1450, the electronic device may point at any position in the VR space 1400 according to the manipulation of the HMD device 1410 and/or the external controller 1450. According to an embodiment, the electronic device may select an object displayed in the VR space 1400 using the HMD device 1410 and/or the external controller 1450. For example, upon selecting a media object, the electronic device may play the selected media object. Referring to FIG. 14, the position at which the external controller 1450 points at may be $(x_2, y_2)$ 1430, and the position 1420 at which the HMD device 1410 points may be $(x_1, y_1)$.

According to an embodiment, the electronic device may perform various manipulations depending on the characteristics of the object pointed at. For example, where the pointed-at object is an execution object, the electronic device may execute, delete, move, or perform other various types of control on, the object. The VR space 1400 may be generated in 3D, and various settings may be made thereto according to an embodiment. Referring to FIG. 14, the electronic device may display a FOV area 1401, which the user may viewed, in the spherical VR space 1400 as a two-dimensional (2D) plane. According to an embodiment, the electronic device may display various objects in the user's FOV area 1401. For example, the electronic device may display an execution screen of a game application including a plurality of character objects and a menu icon, a photo gallery including a plurality of image objects, an execution window of an internet application including text, images, uniform resource locator (URL), or other various objects, or a movie playing screen.

According to an embodiment, the electronic device may point at any position in the VR space 1400 based on a position of the HMD device 1410 in the VR space 1400 or the direction (angle) of the HMD device 1410.

According to an embodiment, the electronic device may point at any position in the VR space 1400 based on a position of the external controller 1450 in the VR space 1400 or the direction (angle) of the external controller 1450. The position 1430 at which the external controller 1450 points or the position 1420 corresponding to the orientation of the HMID device 1410 in the user's FOV area 1401 may be displayed as shown in FIG. 14. According to an embodiment, the electronic device may also display a lead line for the external controller 1450.

According to an embodiment, the electronic device may point at any position in the VR space 1400 using the HMID device 1410 or the external controller 1450. Referring to FIG. 5, the electronic device may point at a first position ($x_1$, $y_1$) in the user's FOV area 1401 depending on the direction that the HMID device 1410 indicates and a second position ($x_2$, $y_2$) in the user's FOV area 1401 depending on the direction that the external controller 1450 indicates.

Figure 15:
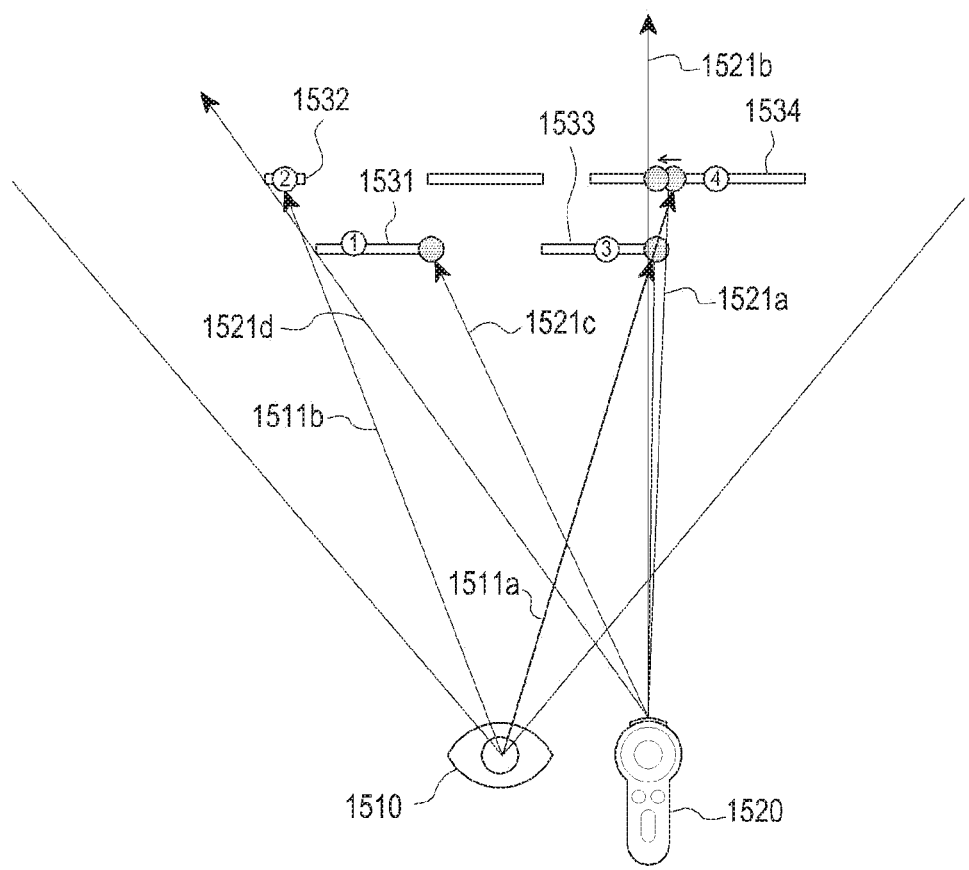
FIG. 15 is a view illustrating the concept of controlling a pointer using an external controller according to an embodiment of the disclosure.

FIG. 15 is a view illustrating the concept of controlling a pointer using an external controller according to an embodiment of the disclosure.

Referring to FIG. 15, upon raycasting in a first direction 1521*a* from a reference position (which is denoted a "first reference position" for illustration purposes) related to an external controller 1520 on a VR space displayed through the display, a fourth object 1534 may be hit, and a pointer may be displayed on the fourth object 1534. The user may identify the pointer displayed on the fourth object 1534 from a reference position (which is denoted a "second reference position 1510" for illustration purposes) corresponding to the central point of the VR space.

According to an embodiment, when the user moves to orient the external controller 1520 from the first direction 1521*a* to a second direction 1521*b*, the external controller 1520 raycasts in the second direction 1521*b*, so that a third object 1533 may be hit and the pointer may be displayed on the third object 1533. When the user tracks and gazes at the pointer in a first gaze direction 1511*a*, the pointer may not be displayed continuously due to a difference in distance and a difference in reference position between the third object 1533 and the fourth object 1534 but may rather be abruptly moved to the right at the moment of the change of objects hit.

According to an embodiment, upon raycasting in a third direction 1521*c* from the reference position (the first reference position) related to the external controller 1520 on the VR space displayed through the display, a first object 1531 may be hit, and the pointer may be displayed on the first object 1531. The user may identify the pointer displayed on the first object 1531 from the reference position (the second reference position 1510) corresponding to the central point of the VR space.

According to an embodiment, when the user moves to orient the external controller 1520 from the third direction 1521*c* to a fourth direction 1521*d*, the external controller 1520 may raycast in the fourth direction 1521*d*.

Upon tracking and gazing at the pointer in a second gaze direction 1511*b*, the user may predict that a second object 1532 is to be hit. However, when the external controller 1520 raycasts, the second object 1532 may be hidden by the first object 1531 and may not thus be hit.

Figure 16:
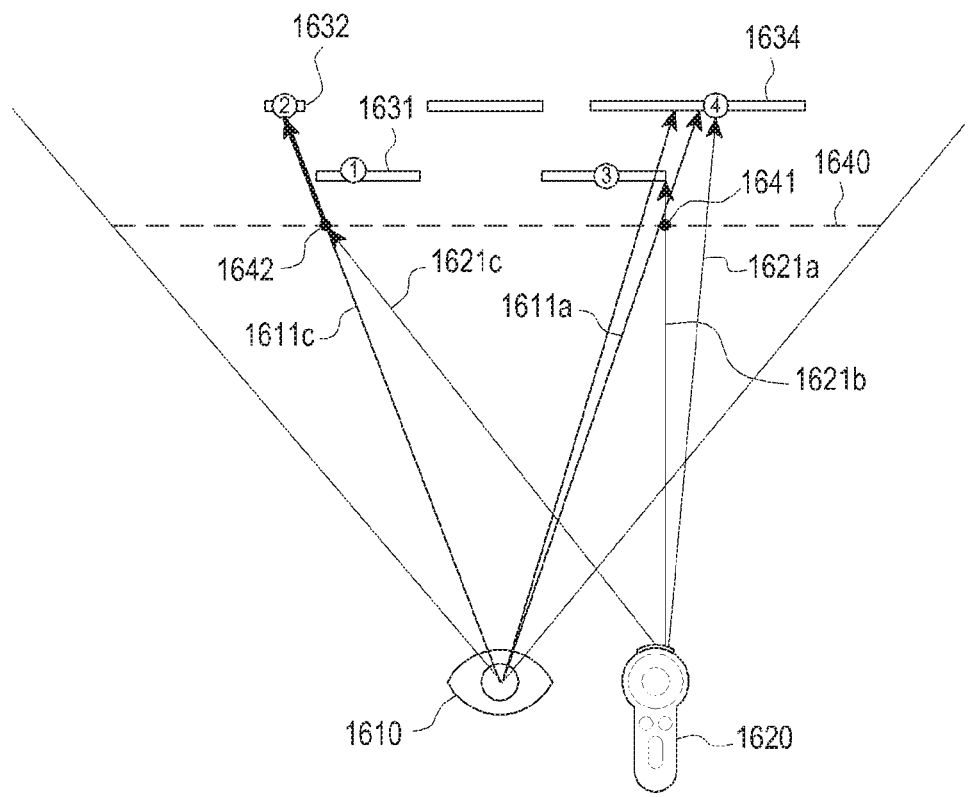
FIG. 16 is a view illustrating the concept of controlling a pointer using an external controller according to an embodiment of the disclosure.

FIG. 16 is a view illustrating the concept of controlling a pointer using an external controller according to an embodiment of the disclosure.

Referring to FIG. 16, upon raycasting in a first direction 1621*a* from a reference position (which is denoted a "first reference position" for illustration purposes) related to an external controller 1620 on a VR space displayed through the display, a fourth object 1634 may be hit. According to an embodiment, a pointer may be displayed a designated distance (e.g., a first distance)—or a distance range—away in a first direction 1621*a* from the reference position (the first reference position) related to the external controller 1620. According to an embodiment, although FIG. 16 illustrates that positions corresponding to the designated distance are denoted with a straight line 1640 for illustration purposes, the positions may alternatively be displayed in a curve corresponding to the same distance from the first reference position related to the external controller 1620 or a second reference position 1610.

According to an embodiment, when the user moves to orient the external controller 1620 from the first direction 1621*a* to a second direction 1621*b*, the external controller 1620 may raycast in the second direction 1621*b*. According to an embodiment, the pointer may be displayed a designated distance (e.g., the first distance)—or a distance range—away in the second direction 1621*b* from the reference position (the first reference position) related to the external controller 1620.

According to an embodiment, the object hit may be determined to be an object that is hit by raycasting in the user's gaze direction. For example, the pointer may be displayed (e.g., at the position 1641) a designated distance (e.g., the first distance)—or a distance range—in the second direction 1621*b* from the reference position (the first reference position) related to the external controller 1620, and the user may identify the pointer displayed in the designated distance from a reference position (which is denoted a "second reference position" for illustration purposes) corresponding to the central point of the VR space.

According to an embodiment, where the user tracks and gazes at the pointer in the first gaze direction 1611*a*, since it is the fourth object 1634 that is hit by raycasting the pointer in the first gaze direction 1611*a*, such a process may be performed as to hit the fourth object 1634. According to an embodiment, the pointer may be displayed a designated distance (e.g., the first distance)—or a distance range—away from the reference position (the first reference position) related to the external controller 1620, and the user may determine whether the object is hit by raycasting from the reference position (the second reference position) corresponding to the user's gaze angle. Thus, the pointer's movement may be continuously displayed on the screen at the user's gaze angle. For example, since the position where the pointer is displayed on the screen may continuously be displayed, discontinuous display of the pointer may be prevented which may arise due to a difference in distance between the objects on the VR space.

According to an embodiment, upon raycasting from the reference position (the first reference position) related to the external controller 1620 to the third direction 1621*c* on the VR space displayed through the display, the external controller 1620 may raycast in the third direction 1621*c*. According to an embodiment, the pointer may be displayed a designated distance (e.g., at the position 1642) away in the third direction 1621c from the reference position (the first reference position) related to the external controller 1620.

According to an embodiment, the object hit may be determined by raycasting from the central point of the VR space for the screen area displayed through the display to the position where the pointer is displayed. For example, the pointer may be displayed a designated distance in the third direction 1621c from the reference position (the first reference position) related to the external controller 1620, and the user may identify the pointer displayed in the designated distance from the reference position (the second reference position) corresponding to the central point of the VR space.

According to an embodiment, where the user tracks and gazes at the pointer in the third gaze direction 1611c, since it is the second object 1632 that is hit by raycasting the pointer in the third gaze direction 1611c, such a process may be performed as to hit the second object 1632. According to an embodiment, the pointer may be displayed a designated distance (e.g., the first distance)—or a distance range—away from the reference position (the first reference position) related to the external controller 1620, and the user may determine whether the object is hit by raycasting from the reference position (the second reference position) corresponding to the user's gaze angle. Thus, although the second object 1632 is hidden by the first object 1631 at the reference position of the external controller 1620, the second object 1632 may be viewed at the user's gaze angle and may thus be selected.

Various examples of displaying a pointer or selecting an object in a VR space are described below with reference to FIGS. 17 to 23, according to various embodiments. Although the VR space displayed through the display of the electronic device is illustrated as a circle in the following embodiments for illustration purposes, where the VR space is a 3D space, the VR space may be represented as a sphere as shown in FIGS. 12 to 14.

Figure 17:
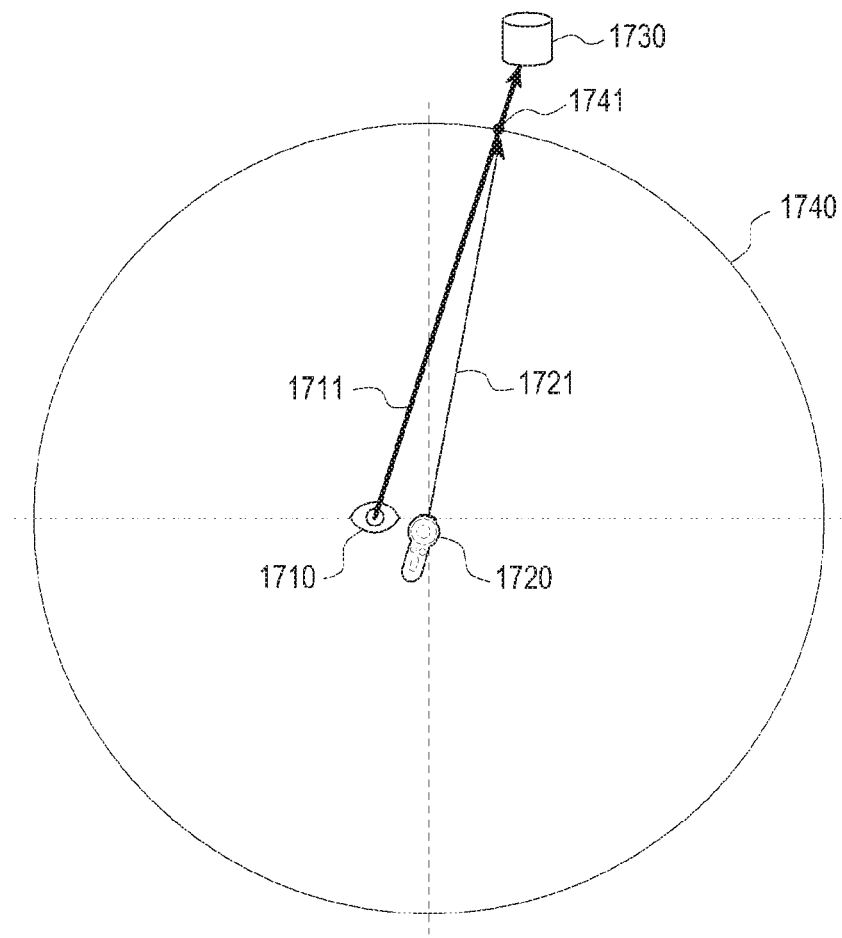
FIG. 17 is a view illustrating an example of controlling a pointer using an external controller according to an embodiment of the disclosure.

FIG. 17 is a view illustrating an example of controlling a pointer using an external controller according to an embodiment of the disclosure.

According to an embodiment, an electronic device (e.g., the electronic device 200 of FIG. 2) may receive a control signal through a communication circuit from an external controller (e.g., the external controller 320 of FIG. 3). The control signal may contain, at least, information related to an orientation of the external controller.

For example, the control signal received from the external controller may contain orientation information corresponding to quaternions, but various embodiments of the disclosure are not limited thereto. The external controller may generate orientation information (e.g., S, X, Y, and Z as in Q=S+Xi+Yj+Zk) corresponding to quaternions by at least one sensor (e.g., a gyro sensor or an acceleration meter) capable of determining direction and transmit the control signal containing the generated orientation information to the electronic device. According to an embodiment, in an initial value for the orientation information, the orientation of the external controller may be initialized by pressing a designated button (e.g., a long press) of the external controller.

Referring to FIG. 17, a pointer may be displayed at a first position 1741 which is a designated first distance (or a first distance range) away in a direction, which is based on at least the received control signal, from a reference position (the first reference position 1720) related to the external controller in the virtual space displayed through the display of the electronic device. According to an embodiment, since the pointer is displayed at positions which are the same distance away from the first reference position 1720, the positions where the pointer may be displayed may be represented as a circle 1740 (or a sphere) having the first reference position 1720 as its central point.

For example, in the embodiment of FIG. 17, raycasting may be performed from the first reference position 1720 related to the external controller in the VR space in the direction which is based on the control signal received from the external controller. According to an embodiment, the pointer may be displayed at the position (e.g., the first position 1741) which is the designated distance away from the first reference position 1720. According to an embodiment, a lead line 1721 may be displayed on the screen to indicate that raycasting occurs from the first reference position 1720 to the first position 1741 which is the designated distance away.

According to an embodiment, the electronic device may perform control to select at least one object positioned on the line 1711 from a reference position (the second reference position 1710) corresponding to the central point of the virtual space for the screen area displayed through the display to the first position 1741. According to an embodiment, the electronic device may perform control to select an object positioned within the shortest distance from the second reference position 1710 among at least one object positioned on the line 1711 from the second reference position 1710 to the first position 1741. For example, the object 1730 of FIG. 17 may be selected.

A method for selecting an object or displaying a pointer as shown in FIG. 17, according to an embodiment, may be implemented in a programming code as follows.

```
pointerPosition = controller.position + (controller.forward*Distance)
raycast from camera.position to pointerPosition
//pointer's target position=controller's position+pointer 10m (distance)
ahead in controller's orientation
Vector3 targetPos = origin.position + transform.forward * distance;
RaycastHit hitInfo;
Collider hitObj = null;
float dist = Vector3.Distance (Camera.main.transform.position, targetPos);
//direction that camera will raycast=pointer's target position-camera's position
Vector3 direction = (targetPos - Camera.main.transform.position).normalized;
//gets object hit by raycast (hitObj: object hit. An effect may be applied to the object when necessary.)
```

-continued

```
    if (Physics.Raycast (Camera.main.transform.position, direction, out
hitInfo, dist)) {
        hitObj = hitInfo.collider;
    }
```

Figure 18:
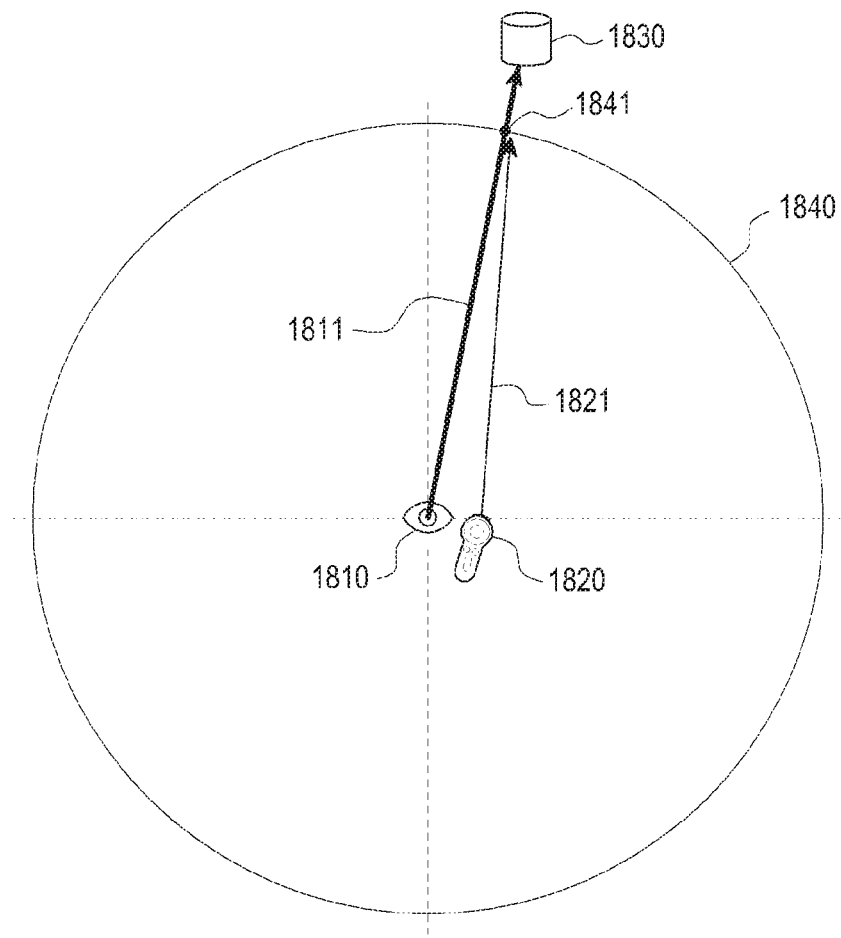
FIG. 18 is a view illustrating an example of controlling a pointer using an external controller according to an embodiment of the disclosure.

FIG. 18 is a view illustrating an example of controlling a pointer using an external controller according to an embodiment of the disclosure.

According to an embodiment, an electronic device (e.g., the electronic device 200 of FIG. 2) may receive a control signal through a communication circuit from an external controller. The control signal may contain, at least, information related to an orientation of the external controller.

Referring to FIG. 18, raycasting may be performed in a direction, which is based on at least the received control signal, from a reference position (the first reference position 1820) related to the external controller in the virtual space displayed through the display of the electronic device.

According to an embodiment, the electronic device may display a pointer at a first position 1841, which is a designated distance away from a reference position (the second reference position 1810) corresponding to the central point of the virtual space for the screen area displayed through the display among positions on the line oriented in the direction based on at least the received control signal from the first reference position 1820 related to the external controller (e.g., the external controller 320 of FIG. 3) in the virtual space displayed through the display of the electronic device.

According to an embodiment, since the pointer is displayed at positions which are the same distance away from the second reference position 1810, the positions where the pointer may be displayed may be represented as a circle 1840 (or a sphere) having the second reference position 1810 as its central point.

For example, in the embodiment of FIG. 18, raycasting may be performed from the first reference position 1820 related to the external controller in the VR space in the direction which is based on the control signal received from the external controller. According to an embodiment, the pointer may be displayed at the position (e.g., the first position 1841) which is the designated distance away from the second reference position 1810. According to an embodiment, a lead line 1821 may be displayed on the screen between the first reference position 1820 and the first position 1841.

According to an embodiment, the electronic device may perform control to select at least one object positioned on the line 1811 from the second reference position 1810 corresponding to the central point of the virtual space for the screen area displayed through the display to the first position 1841. According to an embodiment, the electronic device may perform control to select an object positioned within the shortest distance from the second reference position 1810 among at least one object positioned on the line 1811 from the second reference position 1810 to the first position 1841. For example, the object 1830 of FIG. 18 may be selected.

A method for selecting an object or displaying a pointer as shown in FIG. 18, according to an embodiment, may be implemented by, e.g., matrix computation.

For example, where the first position 1841 of the pointer is (x, y, z), the first position 1841 may be obtained by the following equation. Assuming that the second reference position=$(x_0, y_0, z_0)$, radius=r, the vector of the external controller $v=(v_x, v_y, v_z)$, an equation for the sphere may be represented as Equation 1 below.

$$(x-x_0)^2+(y-y_0)^2+(z-z_0)^2=r^2 \qquad \text{Equation 1}$$

The straight line 1821 raycast from the external controller may be represented as in Equation 2 below.

$$x=x_1+v_x t$$

$$y=y_1+v_y t$$

$$z=z_1+v_z t \qquad \text{Equation 2}$$

t in Equation 2 may be obtained by Equation 3 below.

$$(x_1+v_x t-x_0)^2+(y_1+v_y t-y_0)^2+(z_1+v_z t-z_0)^2=r^2 \qquad \text{Equation 3}$$

After calculating t using Equation 3 above, the coordinates (x, y, z) corresponding to the position of the pointer may be calculated by substituting t in Equation 2 above.

Figure 19:
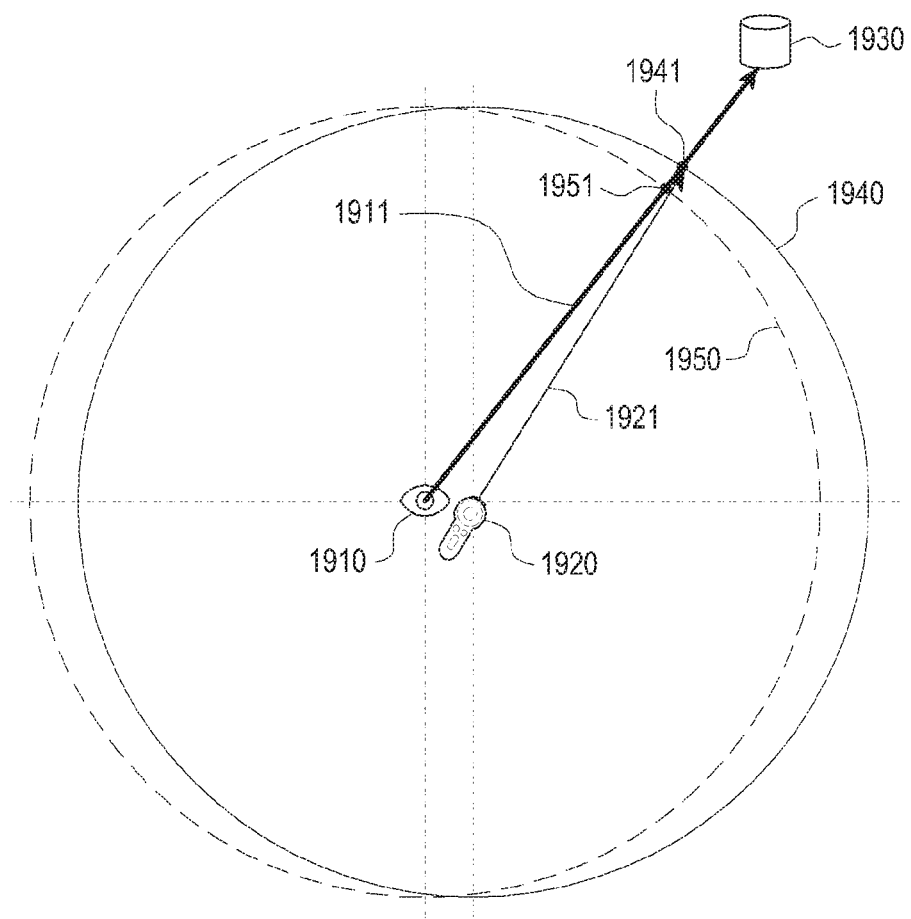
FIG. 19 is a view illustrating an example of controlling a pointer using an external controller according to an embodiment of the disclosure.

FIG. 19 is a view illustrating an example of controlling a pointer using an external controller according to an embodiment of the disclosure.

According to an embodiment, an electronic device (e.g., the electronic device 200 of FIG. 2) may receive a control signal through a communication circuit from an external controller (e.g., the external controller 320 of FIG. 3). The control signal may contain, at least, information related to an orientation of the external controller.

Referring to FIG. 19, a pointer may be displayed based on a first position 1941 which is a designated first distance (or a first distance range) away in a direction, which is based on at least the received control signal, from a reference position (the first reference position 1920) related to the external controller in the virtual space displayed through the display of the electronic device. According to an embodiment, since the pointer is displayed based on positions which are the same distance away from the first reference position 1920, where the first position 1941 may be displayed may be represented as a circle 1940 (or a sphere) having the first reference position 1920 as its central point.

For example, in the embodiment of FIG. 19, the electronic device may display the pointer at the second position 1951 that is a designated second distance (or a second distance range) away from a reference position (the second reference position 1910) corresponding to the central point of the virtual space for the screen area displayed through the display towards the first position 1941. According to an embodiment, since the pointer is displayed based on positions which are the same distance away from the second reference position 1910, where the second position 1951 may be displayed may be represented as a circle 1950 (or a sphere) having the second reference position 1910 as its central point.

Raycasting may be performed from the second reference position 1910 related to the external controller in the VR space to the first position 1941 which is based on the control signal received from the external controller. According to an embodiment, the pointer may be displayed at the position (e.g., the second position 1951) which is the designated distance away from the second reference position 1910. According to an embodiment, a lead line 1921 may be displayed on the screen to indicate that raycasting occurs from the first reference position 1920 to the first position 1941 which is the designated distance away.

According to an embodiment, the electronic device may perform control to select at least one object positioned on the line 1911 from the second reference position 1910 corresponding to the central point of the virtual space for the screen area displayed through the display to the second position 1951. According to an embodiment, the electronic device may perform control to select an object positioned within the shortest distance from the second reference position 1910 among at least one object positioned on the line 1911 from the second reference position 1910 to the second position 1951. For example, the object 1930 of FIG. 19 may be selected.

A method for selecting an object or displaying a pointer as shown in FIG. 19, according to an embodiment, may be implemented in a programming code as follows.

firstHitPoint=controller.forward*Distance pointerPosition=(firstHitPoint−camera.position)
.normalized*Distance raycast from camera.position to pointerPosition In the programming code, normalized may perform computation to normalize the vector value to obtain the directivity of the vector. Multiplying the computed value with the distance may present the position that is the distance away in the orientation. In the above equation, "distance" may mean the radius of the virtual sphere. For example, the radius may be set to a designated value (e.g., 10 m) in the virtual space.

Figure 20:
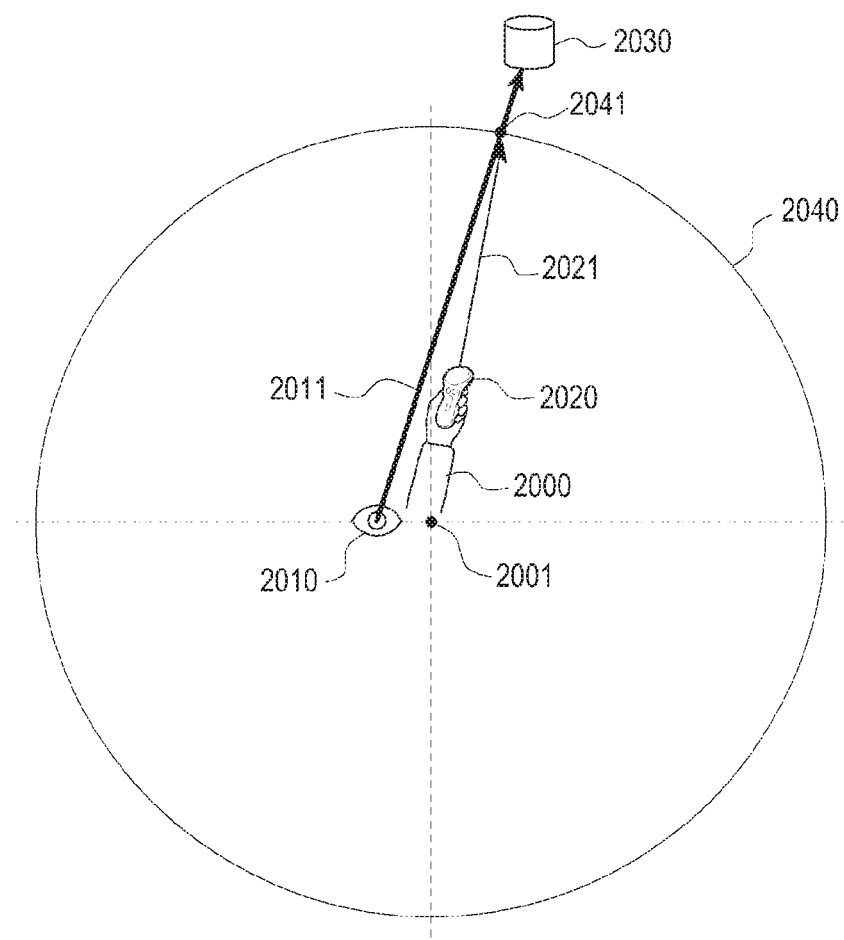
FIG. 20 is a view illustrating an example of controlling a pointer using an external controller according to an embodiment of the disclosure.

FIG. 20 is a view illustrating an example of controlling a pointer using an external controller according to an embodiment of the disclosure.

According to an embodiment, an electronic device (e.g., the electronic device 200 of FIG. 2) may receive a control signal through a communication circuit from an external controller (e.g., the external controller 320 of FIG. 3). The control signal may contain, at least, information related to an orientation of the external controller.

Referring to FIG. 20, a pointer may be displayed at a first position 2041 which is a designated first distance (or a first distance range) away in a direction, which is based on at least the received control signal, from a reference position (the first reference position 2001) related to the external controller 2020 in the virtual space displayed through the display of the electronic device. Considering the case where the user grabs the external controller 2020, the first reference position 2001 related to the external controller may be set to the position of the elbow of the arm 2000 extending from the user's hand holding the external controller 2020.

According to an embodiment, since the pointer is displayed at positions which are the same distance away from the first reference position 2001, the positions where the pointer may be displayed may be represented as a circle 2040 (or a sphere) having the first reference position 2001 as its central point.

For example, in the embodiment of FIG. 20, raycasting may be performed from the first reference position 2001 related to the external controller (e.g., corresponding to the elbow of the arm 2000 extending the user's hand holding the external controller 2020) in the VR space in the direction which is based on the control signal received from the external controller. According to an embodiment, the pointer may be displayed at the position (e.g., the first position 2041) which is the designated distance away from the first reference position 2001. According to an embodiment, a lead line 2021 may be displayed on the screen to indicate that raycasting occurs from the first reference position 2001 to the first position 2041 which is the designated distance away.

According to an embodiment, the electronic device may perform control to select at least one object positioned on the line 2011 from a reference position (the second reference position 2010) corresponding to the central point of the virtual space for the screen area displayed through the display to the first position 2041. According to an embodiment, the electronic device may perform control to select an object positioned within the shortest distance from the second reference position 2010 among at least one object positioned on the line 2011 from the second reference position 2010 to the first position 2041. For example, the object 2030 of FIG. 20 may be selected.

The method for displaying a pointer or selecting an object according to the embodiment of FIG. 20 may be implemented similar to the method according to the embodiment of FIG. 18 and may be implemented to move the external controller using the elbow as its axis, rather than moving the external controller with the wrist of the virtual arm from the user's point of view. In the implementation equation of FIG. 18, a similar method may be implemented by setting the axis of the external controller to be positioned behind by the length of the lower arm.

Figure 21:
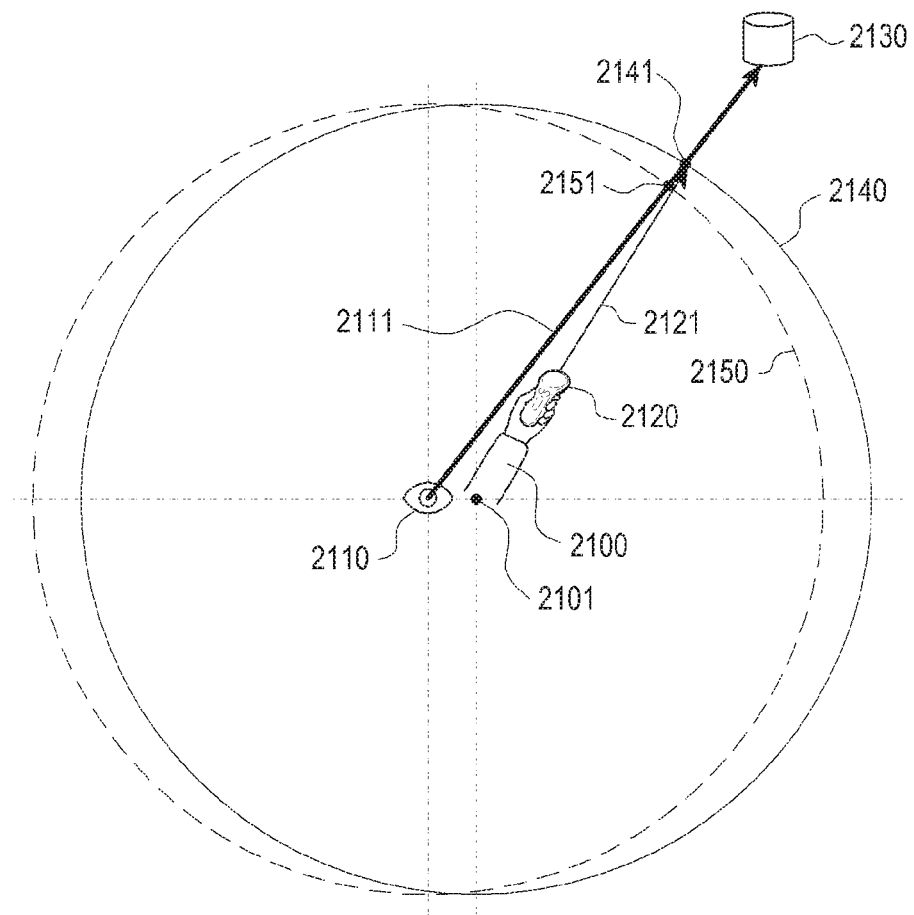
FIG. 21 is a view illustrating an example of controlling a pointer using an external controller according to an embodiment of the disclosure.

FIG. 21 is a view illustrating an example of controlling a pointer using an external controller according to an embodiment of the disclosure.

According to an embodiment, an electronic device (e.g., the electronic device 200 of FIG. 2) may receive a control signal through a communication circuit from an external controller (e.g., the external controller 320 of FIG. 3). The control signal may contain, at least, information related to an orientation of the external controller.

Referring to FIG. 21, a pointer may be displayed based on a first position 2141 which is a designated first distance (or a first distance range) away in a direction, which is based on at least the received control signal, from a reference position (the first reference position 2120) related to the external controller in the virtual space displayed through the display of the electronic device. Considering the case where the user grabs the external controller 2120, the first reference position 2101 related to the external controller may be set to the position of the elbow of the arm 2100 extending from the user's hand holding the external controller 2120. According to an embodiment, since the pointer is displayed based on positions which are the same distance away from the first reference position 2101, where the first position 2141 may be displayed may be represented as a circle 2140 (or a sphere) having the first reference position 2101 as its central point.

For example, in the embodiment of FIG. 21, the electronic device may display the pointer at the second position 2151 that is a designated second distance (or a second distance range) away from a reference position (the second reference position 2110) corresponding to the central point of the virtual space for the screen area displayed through the display towards the first position 2141. According to an embodiment, since the pointer is displayed based on positions which are the same distance away from the second reference position 2110, where the second position 2151 may be displayed may be represented as a circle 2150 (or a sphere) having the second reference position 2110 as its central point.

Raycasting may be performed from the second reference position 2110 related to the external controller in the VR space to the first position 2141 which is based on the control signal received from the external controller. According to an embodiment, the pointer may be displayed at the position (e.g., the second position 2151) which is the designated distance away from the second reference position 2110. According to an embodiment, a lead line 2121 may be displayed on the screen to indicate that raycasting occurs from the first reference position 2101 to the first position 2141 which is the designated distance away.

According to an embodiment, the electronic device may perform control to select at least one object positioned on the line 2111 from the second reference position 2110 corresponding to the central point of the virtual space for the screen area displayed through the display to the second position 2151. According to an embodiment, the electronic device may perform control to select an object positioned within the shortest distance from the second reference position 2110 among at least one object positioned on the line 2111 from the second reference position 2110 to the second position 2151. For example, the object 2130 of FIG. 21 may be selected.

A method for selecting an object or displaying a pointer as shown in FIG. 21, according to an embodiment, may be implemented in a programming code as follows.

```
firstHitPoint=controllerAxis.forward*Distance pointerPosition=(firstHitPoint-camera.position)
    .normalized*Distance raycast from camera.position to pointerPosition
```

In the programming code, normalized may perform computation to normalize the vector value to obtain the directivity of the vector. Multiplying the computed value with the distance may present the position that is the distance away in the orientation. In the above equation, "distance" may mean the radius of the virtual sphere. For example, the radius may be set to a designated value (e.g., 10 m) in the virtual space.

Figure 22:
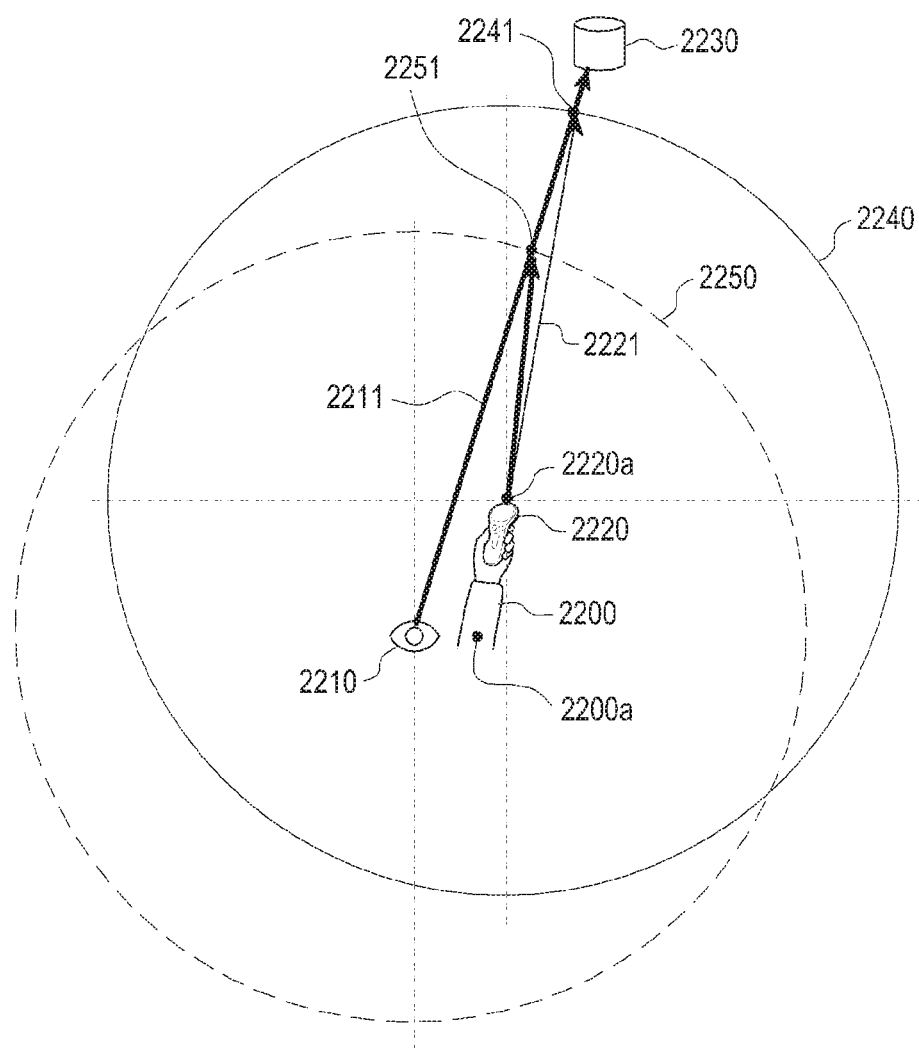
FIG. 22 is a view illustrating an example of controlling a pointer using an external controller according to an embodiment of the disclosure.

FIG. 22 is a view illustrating an example of controlling a pointer using an external controller according to an embodiment of the disclosure.

According to an embodiment, an electronic device (e.g., the electronic device 200 of FIG. 2) may receive a control signal through a communication circuit from an external controller (e.g., the external controller 320 of FIG. 3). The control signal may contain, at least, information related to an orientation of the external controller.

Referring to FIG. 22, a pointer may be displayed based on a first position 2241 which is a designated first distance (or a first distance range) away in a direction, which is based on at least the received control signal, from a reference position (the first reference position 2220a) related to the external controller in the virtual space displayed through the display of the electronic device. Considering the case where the user grabs the external controller 2220, the first reference position 2220a related to the external controller 2220 may be set to the position of the tip of the external controller 2220, with the position 2200a of the elbow of the arm 2200 extending from the user's hand holding the external controller 2220 taken as the axis. According to an embodiment, since the pointer is displayed based on positions which are the same distance away from the first reference position 2220a, where the first position 2241 may be displayed may be represented as a circle 2240 (or a sphere) having the first reference position 2220a as its central point.

For example, in the embodiment of FIG. 22, the electronic device may display the pointer at the second position 2251 that is a designated second distance (or a second distance range) away from a reference position (the second reference position 2210) corresponding to the central point of the virtual space for the screen area displayed through the display towards the first position 2241. According to an embodiment, since the pointer is displayed based on positions which are the same distance away from the second reference position 2210, where the second position 2251 may be displayed may be represented as a circle 2250 (or a sphere) having the second reference position 2210 as its central point.

Raycasting may be performed from the second reference position 2210 related to the external controller in the VR space to the first position 2241 which is based on the control signal received from the external controller. According to an embodiment, the pointer may be displayed at the position (e.g., the second position 2251) which is the designated distance away from the second reference position 2210. According to an embodiment, a lead line 2221 may be displayed on the screen to indicate that raycasting occurs from the first reference position 2220a to the first position 2241 which is the designated distance away.

According to an embodiment, the electronic device may perform control to select at least one object positioned on the line 2211 from the second reference position 2210 corresponding to the central point of the virtual space for the screen area displayed through the display to the second position 2251. According to an embodiment, the electronic device may perform control to select an object positioned within the shortest distance from the second reference position 2210 among at least one object positioned on the line 2211 from the second reference position 2210 to the second position 2251. For example, the object 2230 of FIG. 22 may be selected.

A method for selecting an object or displaying a pointer as shown in FIG. 22, according to an embodiment, may be implemented in a programming code as follows.

```
firstHitPoint=controller.forward*Distance pointerPosition=(firstHitPoint-camera.position).nor-
    malized raycast from camera.position to pointerPosition lazerLine=DrawLine(controller.position,pointerPosi-
    tion)
```

In the programming code, normalized may perform computation to normalize the vector value to obtain the directivity of the vector. Multiplying the computed value with the distance may present the position that is the distance away in the orientation. In the above equation, "distance" may mean the radius of the virtual sphere. For example, the radius may be set to a designated value (e.g., 10 m) in the virtual space.

Figure 23:
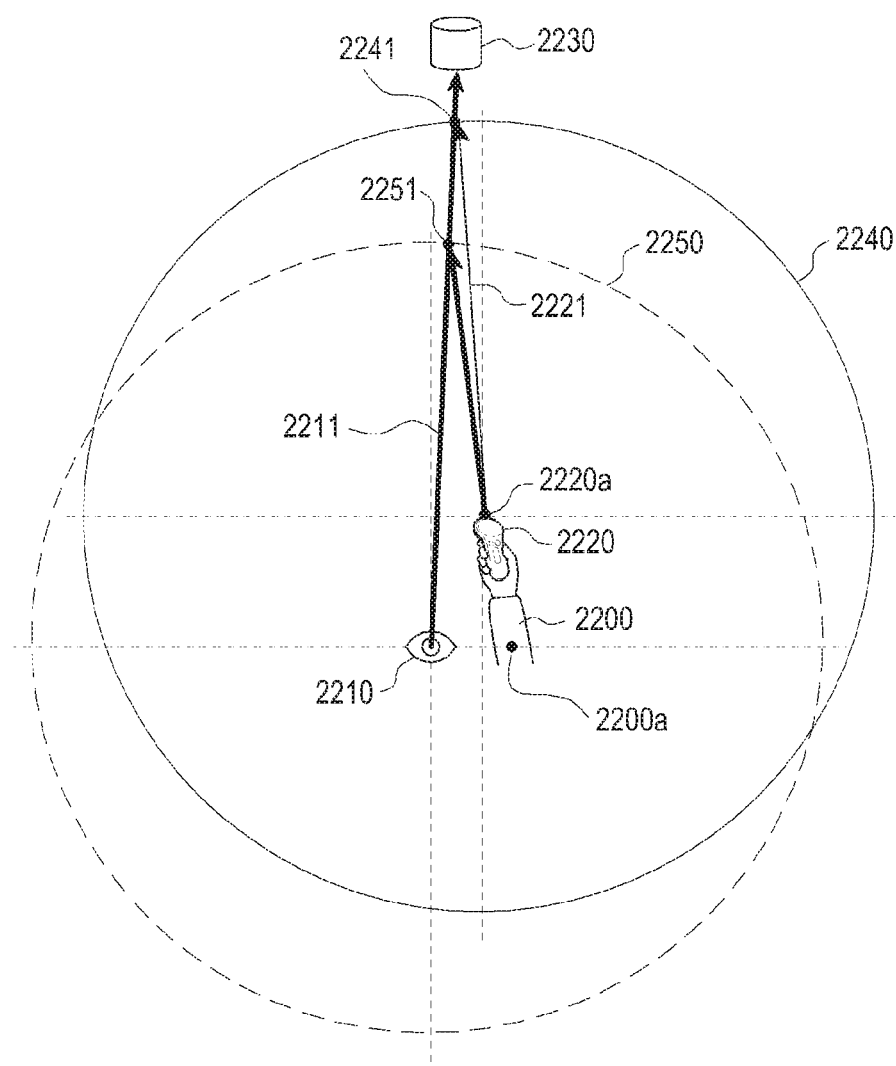
FIG. 23 is a view illustrating an example of controlling a pointer using an external controller according to an embodiment of the disclosure.

FIG. 23 is a view illustrating an example of controlling a pointer using an external controller according to an embodiment of the disclosure.

Referring to FIG. 23, upon moving the external controller 2220 in the example of FIG. 22, the position 2200a of the elbow of the arm 2200 extending from the hand holding the external controller 2220 may be taken as the axis for the motion. Since the first reference position 2220a has been set to the tip of the external controller 2220, the first reference position 2220a and the second reference position 2210 may be changed relative to each other. In this case, the external controller 2220 may have a degree-of-freedom (DOF) of 6.

According to an embodiment, the pointer 2251 may be displayed differently based on the distance between the selected object 2230 and the second reference position 2210. For example, since the pointer 2251 may be implemented to be positioned a predetermined distance away from the second reference position 2210 in the space, the pointer may be differently displayed depending on the distance to give perspective with the selected object 2230.

For example, as the distance between the selected object 2230 and the second reference position 2210 reduces, the pointer 2251 may be enlarged. Upon selecting the object 2230, various effects may be added, such as changing shading, color, brightness, or chroma, resizing, or bordering, to visually indicate the selection of the object 2230.

Hereinafter, various examples in which various embodiments of the disclosure are implemented in a VR space are described with reference to FIGS. 24 to 28.

Figure 24:
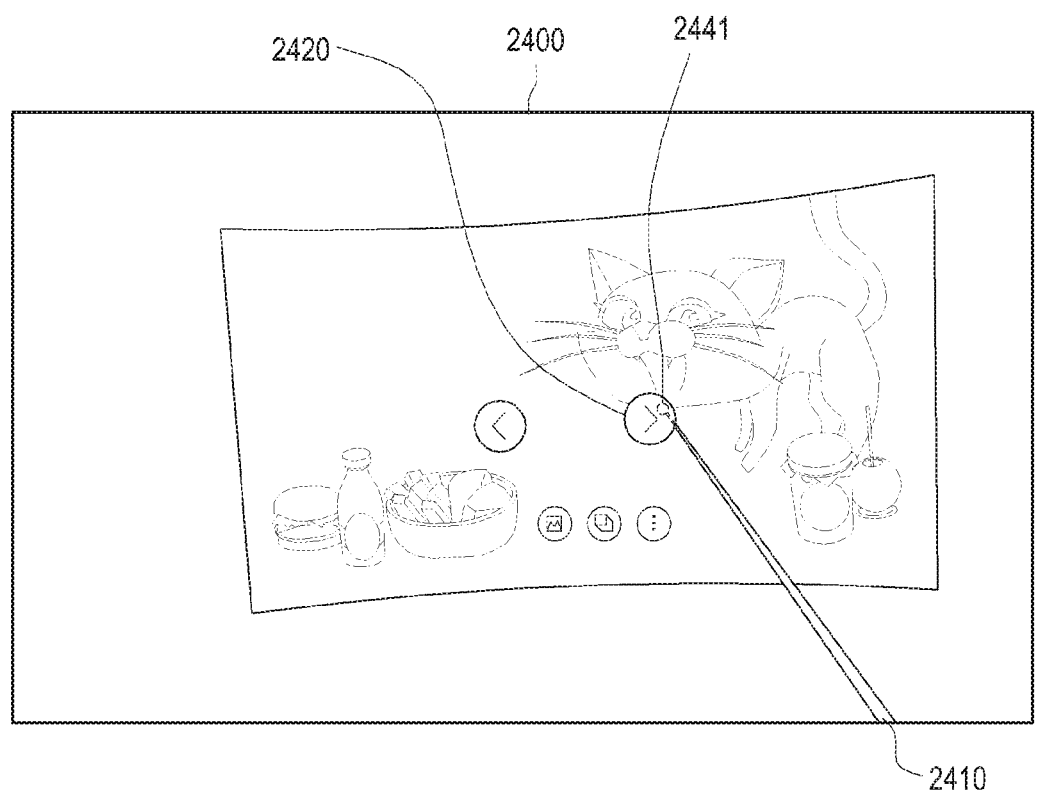
FIG. 24 is a view illustrating an example of displaying a pointer on a VR screen according to an embodiment of the disclosure.

FIG. 24 is a view illustrating an example of displaying a pointer on a VR screen according to an embodiment of the disclosure.

Referring to FIG. 24, a selection button 2420 may be displayed as an object in various shapes on a VR screen 2400.

According to an embodiment, a line 2410 raycast from an external controller (e.g., the external controller 320 of FIG. 3) may be displayed. Upon determining to hit the object with respect to the line raycast from the external controller, a pointer 2441 may be displayed behind the selection button 2420 unlike what the user sees, thus failing to hit the selection button 2420.

Figure 25:
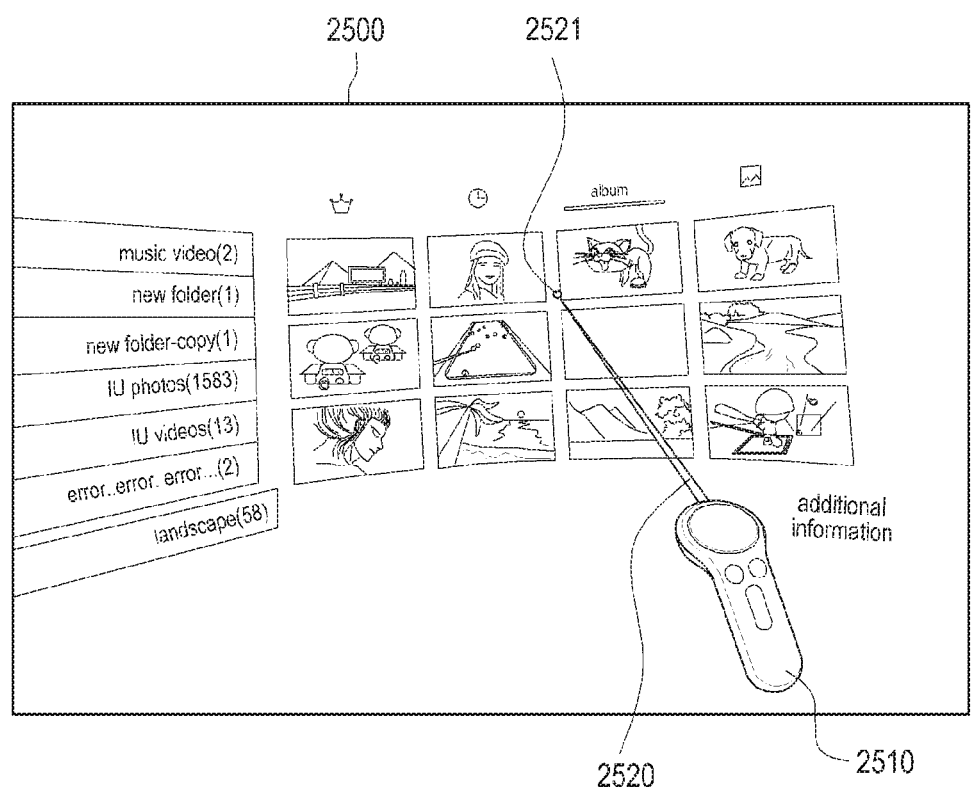
FIG. 25 is a view illustrating an example of displaying a pointer on a VR screen according to an embodiment of the disclosure.
Figure 26:
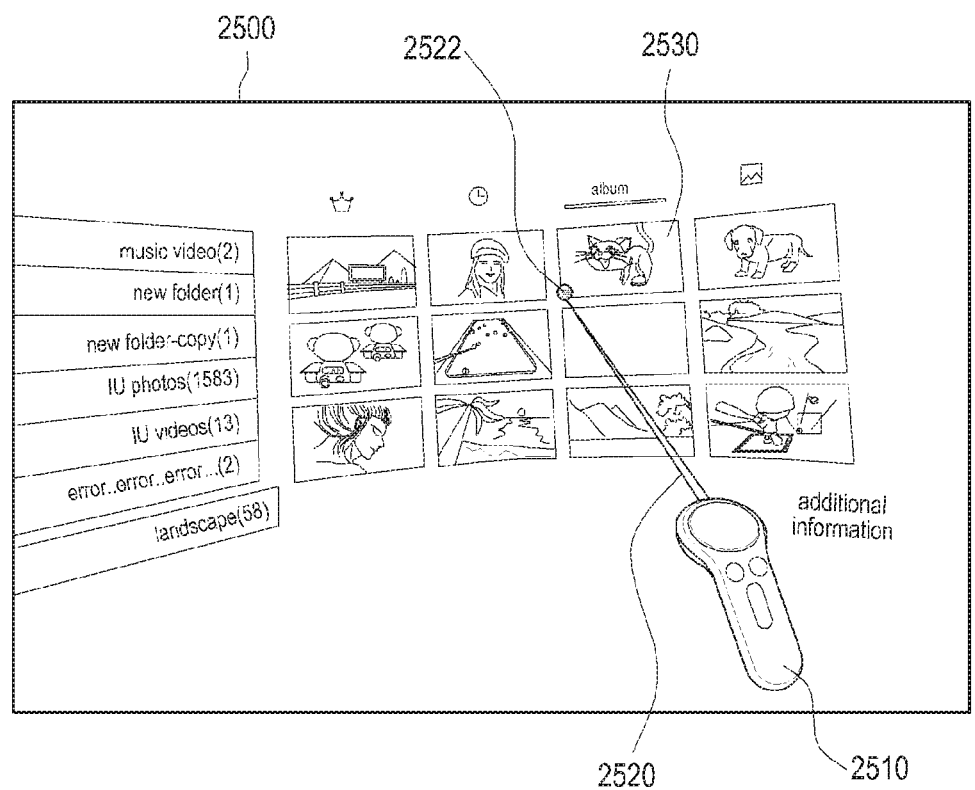
FIG. 26 is a view illustrating an example of displaying a pointer on a VR screen according to an embodiment of the disclosure.

FIGS. 25 and 26 are views illustrating an example of displaying a pointer on a VR screen according to an embodiment of the disclosure.

Referring to FIGS. 25 and 26, various objects (e.g., a menu and an image 2530) may be displayed on the VR screen 2500.

According to an embodiment, a line 2520 raycast from an external controller 2510 (e.g., the external controller 320 of FIG. 3) may be displayed, and a pointer 2521 or 2522 may be displayed in a designated distance along the direction that the external controller 2510 raycasts. Raycasting may be performed in the user's gaze direction to allow an object to be selected, enabling easier selection of the object at the user's gaze angle. For example, upon moving the pointer from the position 2521 of FIG. 25 to the right, the pointer may be displayed at the position 2522 of FIG. 26. The pointer may be naturally and seamlessly displayed when passing across the border of the object 2530 at the user's gaze angle while allowing the object 2530 to be selected.

Figure 27:
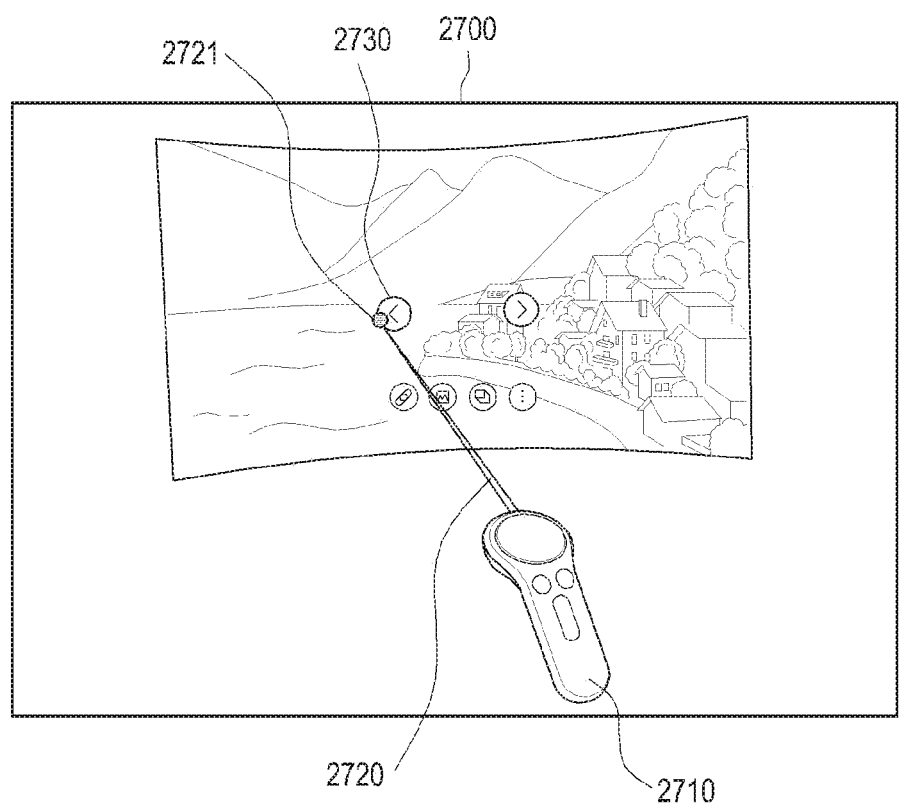
FIG. 27 is a view illustrating an example of displaying a pointer on a VR screen according to an embodiment of the disclosure.
Figure 28:
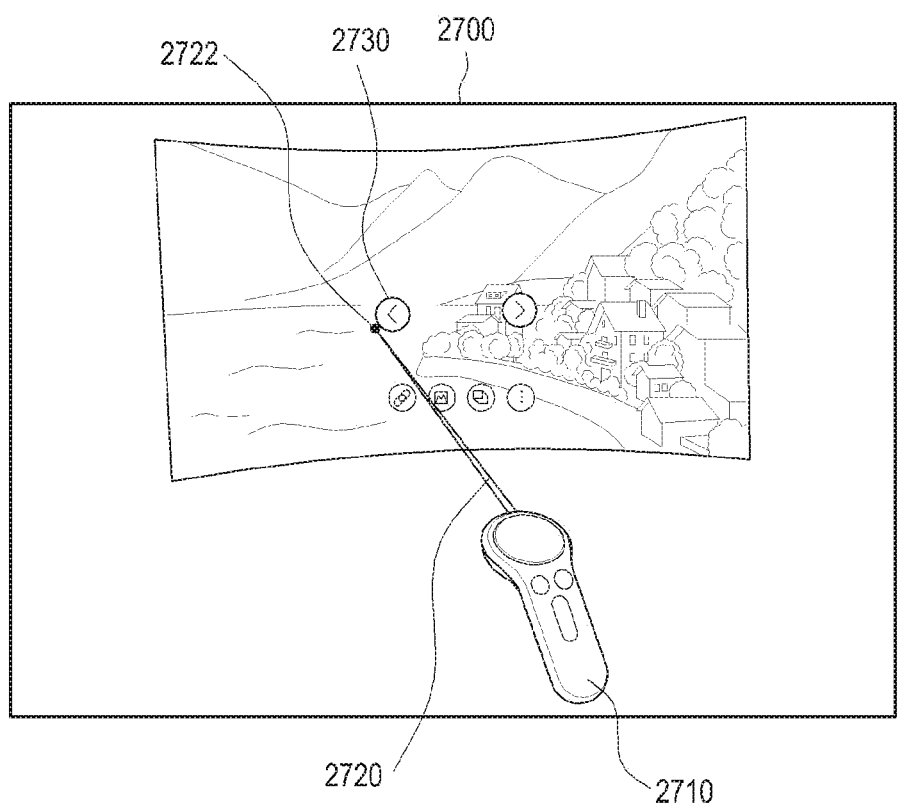
FIG. 28 is a view illustrating an example of displaying a pointer on a VR screen according to an embodiment of the disclosure.

FIGS. 27 and 28 are views illustrating an example of displaying a pointer on a VR screen according to an embodiment of the disclosure.

Referring to FIGS. 27 and 28, various objects (e.g., a menu button 2730) may be displayed on the VR screen 2700.

According to an embodiment, a line 2720 raycast from an external controller 2710 (e.g., the external controller 320 of FIG. 3) may be displayed, and a pointer 2721 or 2722 may be displayed in a designated distance along the direction that the external controller 2710 raycasts. Raycasting may be performed in the user's gaze direction to allow an object to be selected, enabling easier selection of the object at the user's gaze angle. For example, upon moving the pointer from the position 2721 of FIG. 27 to the left, the pointer may be displayed at the position 2722 of FIG. 28. The pointer may be naturally and seamlessly displayed when passing across the border of the object 2730 at the user's gaze angle while allowing the object 2730 to be deselected.

Figure 29:
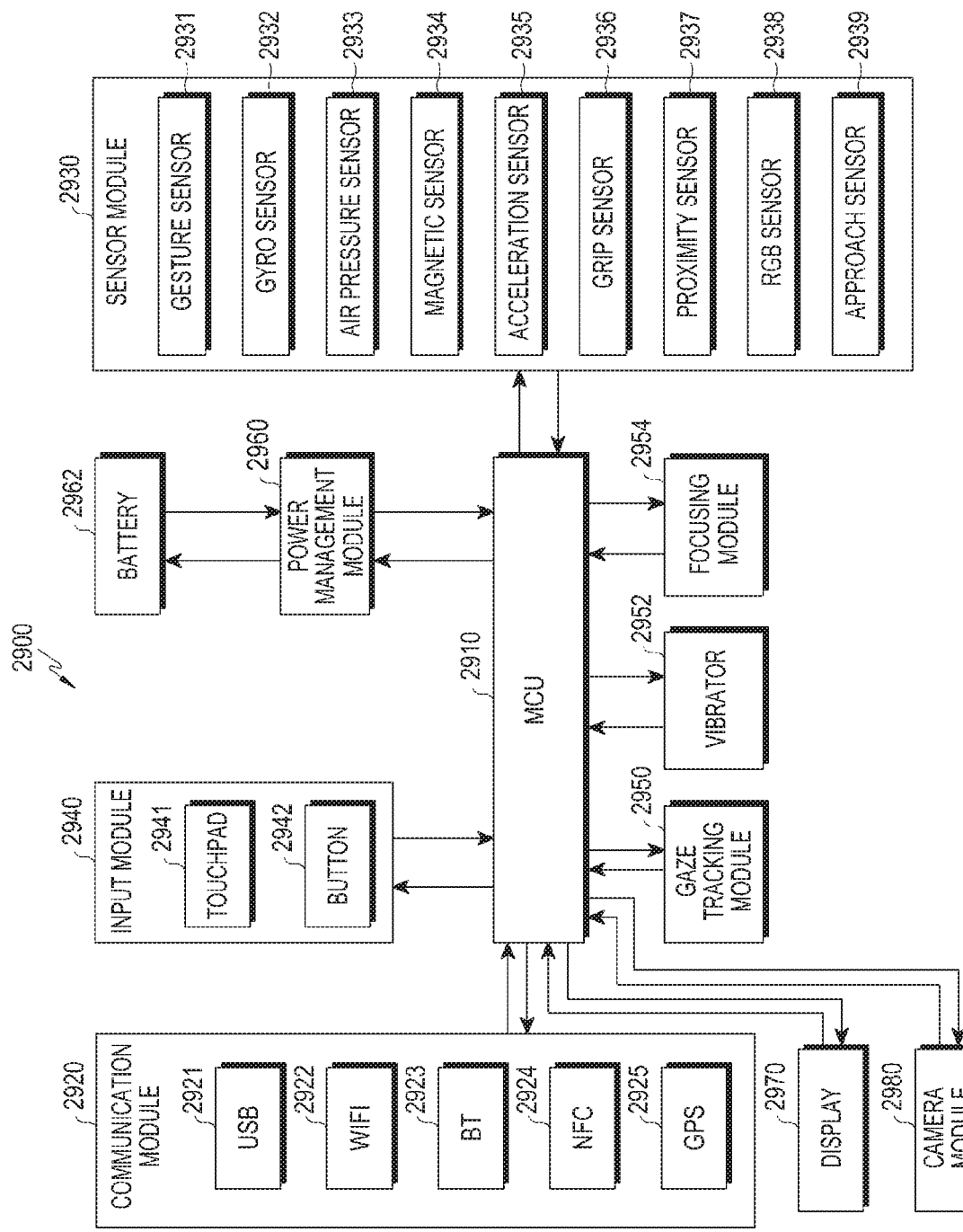
FIG. 29 is a block diagram illustrating an example of a configuration of an HMD device according to an embodiment of the disclosure.

FIG. 29 is a block diagram illustrating another configuration of an HMD device 2900 according to an embodiment of the disclosure.

Referring to FIG. 29, the HMD device 2900 may provide the user with the same or similar operations to those provided by the above-described electronic device independently from an electronic device (e.g., a display device) to be mounted thereon. The HMD device 2900 may include a micro control unit (MCU) 2910, a communication module 2920, a sensor module 2930, an input module 2940, a gaze tracking module 2950, a vibrator 2952, a focusing module 2954, a power management module 2960, a battery 2962, a display 2970, and a camera module 2980.

The communication module 2920 may include, e.g., a universal serial bus (USB) module 2921, a Wi-Fi module 2922, a Bluetooth (BT) module 2923, a near-field communication (NFC) module 2924, and a global positioning system (GPS) module 2925. The sensor module 2930 may include at least one of, e.g., an acceleration sensor 2931, a gyro sensor 2932, an air pressure sensor 2933, a magnetic sensor 2934, an acceleration sensor 2935, a grip sensor 2936, a proximity sensor 2937, a red-green-blue (RGB) sensor 2938, and an approach sensor 2939. The input module 2940 may include a touch pad 2941 and a button 2942.

The HMID device 2900, rather than having a structure in which an electronic device (e.g., a display apparatus) is detachably coupled, may include the display 2970 that may be installed in the body in a fixed manner.

Figure 30:
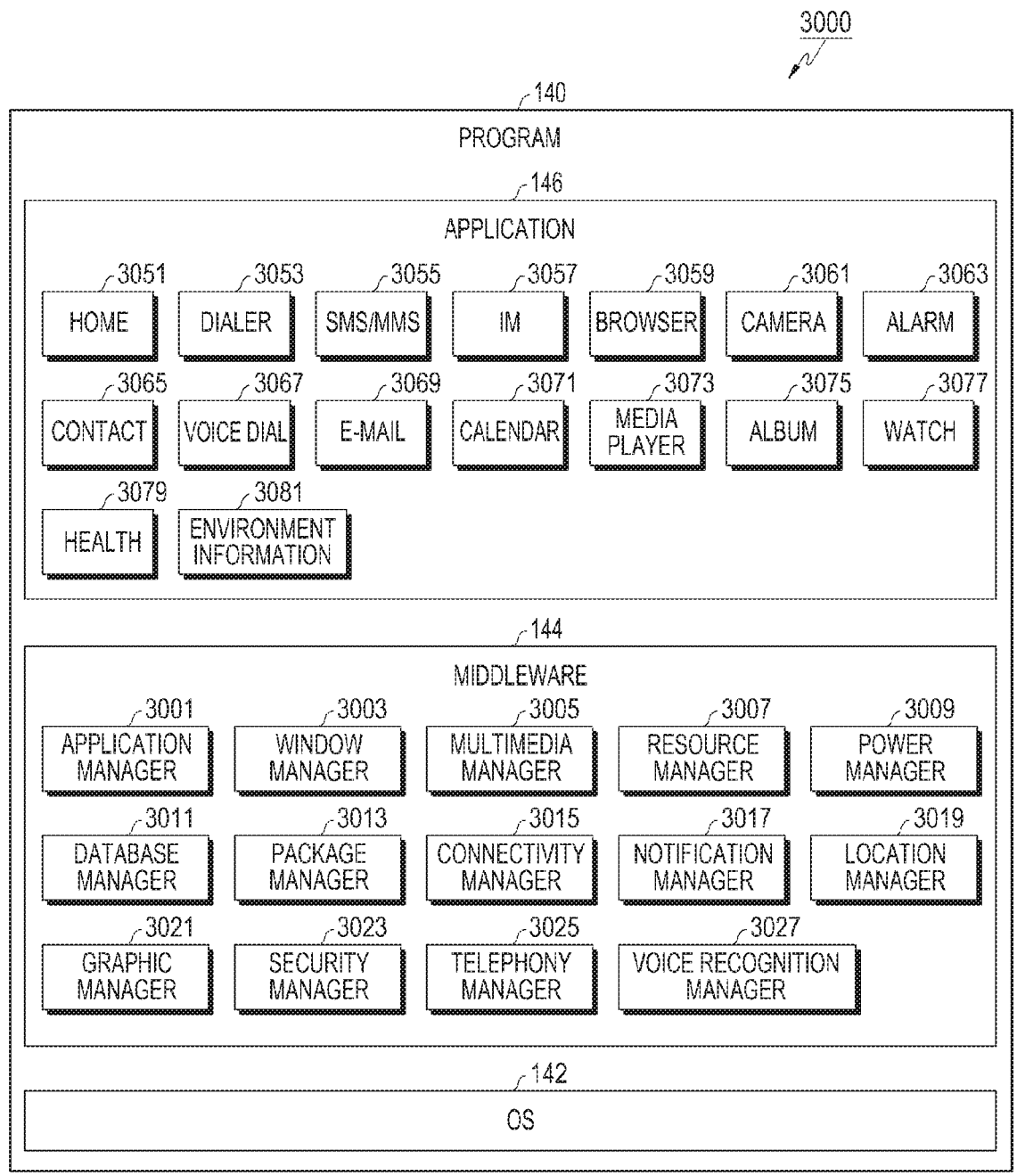
FIG. 30 is a block diagram illustrating a program module according to an embodiment of the disclosure.

FIG. 30 is a block diagram 3000 illustrating a program 140 according to an embodiment of the disclosure.

Referring to FIG. 30, according to an embodiment, the program 140 may include an operating system (OS) 142 to control one or more resources of the electronic device 101, middleware 144, or an application 146 executable on the OS 142. The OS 142 may include, for example, Android™, iOS™, Windows™, Symbian™, Tizen™, or Bada™. At least part of the program 140 may be pre-loaded on the electronic device 101, e.g., upon manufacture, or may be downloaded or updated by an external electronic device (e.g., the electronic device 102 or 104 or the server 108) in a user's use environment.

The OS 142 may control (e.g., allocate or recover) system resources (e.g., the processor, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 290, the subscriber identification module 296, or the antenna module 297.

The middleware 144 may provide various functions to the application 146 so that the application 146 may use functions or information provided from one or more resources of the electronic device 101. The middleware 144 may include, for example, an application manager 3001, a window manager 3003, a multimedia manager 3005, a resource manager 3007, a power manager 3009, a database manager 3011, a package manager 3013, a connectivity manager 3015, a notification manager 3017, a location manager 3019, a graphic manager 3021, a security manager 3023, a telephony manager 3025, or a voice recognition manager 3027. The application manager 3001 may manage the life cycle of, e.g., the applications 146. The window manager 3003 may manage, e.g., GUI resources used on the screen. The multimedia manager 3005 may grasp, e.g., formats necessary to play media files and use a codec appropriate for a format to perform encoding or decoding on media files. The resource manager 3007 may manage, e.g., the source code or memory space of the application 146. The power manager 3009 may manage, e.g., the capacity, temperature, or power of the battery and determine and provide power information necessary for the operation of the electronic device 101 using a corresponding piece of information of such. According to an embodiment, the power manager 3009 may interwork with a basic input/output system (BIOS).

The database manager 3011 may generate, search, or vary a database to be used in the applications 146. The package manager 3013 may manage, e.g., installation or update of an application that is distributed in the form of a package file. The connectivity manager 3015 may manage, e.g., wireless or wired connection between the electronic device 101 and an external electronic device. The notification manager 3017 may provide, e.g., a function for notifying a user of an event (e.g., a call, message, or alert) that occurs. The location manager 3019, for example, may manage locational information on the electronic device 101. The graphic manager 3021 may manage graphic effects to be offered to the user and their related user interface. The security manager 3023 may provide system security or user authentication, for example. The telephony manager 3025 may manage, e.g., a voice call or video call function of the electronic device 101. The voice recognition manager 3027 may transmit, e.g., a user's voice data to the server 108 and receive a command corresponding to a function to be executed on the electronic device 101 based on the voice data or text data converted based on the voice data. According to an embodiment, the middleware 3044 may dynamically delete some existing components or add new components. According to an embodiment, at least part of the middleware 144 may be included as part of the OS 142 or may be implemented in separate software from the OS 142.

The application 146 may include, e.g., an application, such as a home 3051, a dialer 3053, a short message service (SMS)/multimedia messaging service (MIMS) 3055, an instant message (IM) 3057, a browser 3059, a camera 3061, an alarm 3063, a contact 3065, a voice recognition 3067, an email 3069, a calendar 3071, a media player 3073, an album 3075, or a watch 3077, a health 3079 (e.g., measuring the degree of workout or blood sugar), or environmental information 3081 (e.g., air pressure, moisture, or temperature information). According to an embodiment, the application 146 may further include an information exchanging application (not shown) that is capable of supporting information exchange between the electronic device 101 and the external electronic device. The information exchange application may include, e.g., a notification relay application for transferring designated information (e.g., a call, message, or alert) to the external electronic device or a device management application for managing the external electronic device. The notification relay application may transfer notification information corresponding to an event (e.g., receipt of an email) that occurs at another application (e.g., the email application 3069) of the electronic device 101 to the external electronic device, or the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard disks, floppy disks, and magnetic tapes (e.g., a magnetic tape), optical media such as compact disc ready only memories (CD-ROMs) and digital versatile discs (DVDs), magneto-optical media such as floptical disks, ROMs, random access memories (RAMs), flash memories, and/or the like. Examples of the program instructions may include not only machine language codes but also high-level language codes which are executable by various computing means using an interpreter. The aforementioned hardware devices may be configured to operate as one or more software modules to carry out various embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

According to an embodiment, there is provided a storage medium storing instructions configured to be executed by at least one processor to enable the at least one processor to perform at least one operation that, in a method for controlling a pointer in VR, may comprise receiving a control signal from an external controller through a communication circuit of an electronic device, identifying a direction based on at least the received control signal, determining a first position in a designated first distance range, which is away from a first reference position related to the external controller along the identified direction, in a virtual space displayed through a display of the electronic device, and controlling the display to display the pointer on a screen of the virtual space based on the first position.

According to an embodiment, there is provided a storage medium storing instructions configured to be executed by at least one processor to enable the at least one processor to perform at least one operation that may comprise receiving a control signal from an external controller through a communication circuit of the electronic device, identifying a direction based on at least the received control signal, determining a first position in a designated first distance range, which is away from a second reference position corresponding to a central point of a virtual space, which is displayed through a display of the electronic device, among positions on a line oriented from a first reference position related to the external controller along the identified direction, in the virtual space, and controlling the display to display the pointer on a screen of the virtual space based on the determined first position.

As is apparent from the foregoing description, according to various embodiments, a method and electronic device for controlling a pointer in VR may select an object or display the pointer considering the user's view angle by allowing the pointer to be displayed at a point positioned within a designated distance from a reference position corresponding to an external controller interworking with an HMD device or an object to be selected based on the point positioned within the designated distance.

For example, even where at least some of a plurality of objects with different distances in the VR space overlap each other, the object viewed at the user's perspective may intuitively be selected, and when the pointer is moved by the external controller, the pointer may be displayed on the screen in a natural, seamless way.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a communication circuit;
a memory; and at least one processor electrically connected with the display, the communication circuit, and the memory,
wherein the memory stores instructions that instruct the at least one processor to:
receive a control signal from an external controller through the communication circuit, the control signal including information indicating an orientation of the external controller,
identify a first direction based on at least the received control signal,
determine a first position in a designated first distance from a first reference position related to the external controller along the identified first direction, in a virtual space displayed through the display,
control the display to display a pointer on a screen of the virtual space based on the first position, and
control the display to display the pointer on the screen of the virtual space at a second position in the designated first distance from the first reference position along a second direction in response to detecting a change in direction corresponding to the orientation of the external controller from the first direction to the second direction.

2. The electronic device of claim 1, wherein the instructions further instruct the at least one processor to:
select at least one object on a line from a second reference position corresponding to a central point of the virtual space to the first position.

3. The electronic device of claim 2, wherein the instructions further instruct the at least one processor to:
select an object positioned within a shortest distance from the second reference position among the at least one object on the line from the second reference position to the first position.

4. The electronic device of claim 1, wherein the first reference position related to the external controller is set by considering a position of an arm of a user holding the external controller.

5. The electronic device of claim 1, wherein the instructions further instruct the at least one processor to:
display the pointer at a second position in a designated second distance from a second reference position corresponding to a central point of the virtual space towards the first position.

6. The electronic device of claim 2, wherein the instructions further instruct the at least one processor to:
control the display of the pointer based on a distance between the selected at least one object and the second reference position.

7. The electronic device of claim 6, wherein the instructions further instruct the at least one processor to:
determine a size of the pointer based on the distance between the selected at least one object and the second reference position.

8. The electronic device of claim 2, wherein the instructions further instruct the at least one processor to:
display whether the at least one object is selected.

9. An electronic device comprising:
a display;
a communication circuit;
a memory; and
at least one processor electrically connected with the display, the communication circuit, and the memory,
wherein the memory stores instructions that instruct the at least one processor to:
receive a control signal from an external controller through the communication circuit, the control signal including information indicating an orientation of the external controller,
identify a first direction based on at least the received control signal,
determine a first position in a designated first distance from a second reference position corresponding to a central point of a virtual space, which is displayed through the display, among positions on a line oriented from a first reference position related to the external controller along the identified first direction, in the virtual space,
control the display to display a pointer on a screen of the virtual space based on the determined first position, and
control the display to display the pointer on the screen of the virtual space at a second position in the designated first distance from the second reference position, among positions on a line oriented from the first reference position along a second direction in response to detecting a change in direction corresponding to the orientation of the external controller from the first direction to the second direction.

10. The electronic device of claim 9, wherein the instructions further instruct the at least one processor to:
select at least one object on the line from the second reference position to the first position.

11. A method for controlling a pointer in virtual reality (VR), the method comprising:
receiving a control signal from an external controller through a communication circuit of an electronic device, the control signal including information indicating an orientation of the external controller;
identifying a first direction based on at least the received control signal;
determining a first position in a designated first distance from a first reference position related to the external controller along the identified first direction, in a virtual space displayed through a display of the electronic device;
controlling the display to display the pointer on a screen of the virtual space based on the first position; and
controlling the display to display the pointer on the screen of the virtual space at a second position in the designated first distance from the first reference position along a second direction in response to detecting a change in direction corresponding to the orientation of the external controller from the first direction to the second direction.

12. The method of claim 11, further comprising:
performing a control to select at least one object on a line from a second reference position corresponding to a central point of the virtual space to the first position.

13. The method of claim 12, further comprising:
performing a control to select an object positioned within a shortest distance from the second reference position among the at least one object on the line from the second reference position to the first position.

14. The method of claim 11, wherein the first reference position related to the external controller is set considering a position of an arm of a user holding the external controller.

15. The method of claim 11, further comprising:
performing a control to display the pointer at a second position in a designated second distance from a second reference position corresponding to a central point of the virtual space towards the first position.

16. The method of claim 12, further comprising:
controlling the display of the pointer based on a distance between the selected at least one object and the second reference position.

17. The method of claim 16, further comprising:
determining a size of the pointer based on the distance between the selected at least one object and the second reference position.

18. The method of claim 12, further comprising:
performing a control to display whether the at least one object is selected.

19. A method for controlling a pointer in virtual reality (VR), the method comprising:
receiving a control signal from an external controller through a communication circuit of an electronic device, the control signal including information indicating an orientation of the external controller;
identifying a first direction based on at least the received control signal;
determining a first position in a designated first distance from a second reference position corresponding to a central point of a virtual space, which is displayed through a display of the electronic device, among positions on a line oriented from a first reference position related to the external controller along the identified first direction, in the virtual space;
controlling the display to display the pointer on a screen of the virtual space based on the determined first position; and
controlling the display to display the pointer on the screen of the virtual space at a second position in the designated first distance from the second reference position, among positions on a line oriented from the first reference position along a second direction in response to detecting a change in direction corresponding to the orientation of the external controller from the first direction to the second direction.

20. The method of claim 19, further comprising:
performing a control to select at least one object on a line from the second reference position to the first position.

* * * * *